United States Patent
Mitsue et al.

(10) Patent No.: US 7,305,765 B2
(45) Date of Patent: Dec. 11, 2007

(54) BEARING UNIT FOR WHEEL AND METHOD OF MANUFACTURING THE BEARING UNIT

(75) Inventors: Naoki Mitsue, Kanagawa (JP); Junshi Sakamoto, Kanagawa (JP); Yuji Nakamura, Kanagawa (JP)

(73) Assignee: NSK Ltd., Tokyo (JP)

( * ) Notice: Subject to any disclaimer, the term of this patent is extended or adjusted under 35 U.S.C. 154(b) by 99 days.

(21) Appl. No.: 10/531,702

(22) PCT Filed: Sep. 18, 2003

(86) PCT No.: PCT/JP03/11934

§ 371 (c)(1),
(2), (4) Date: Apr. 18, 2005

(87) PCT Pub. No.: WO2004/035326

PCT Pub. Date: Apr. 29, 2004

(65) Prior Publication Data

US 2006/0002644 A1    Jan. 5, 2006

(30) Foreign Application Priority Data

Oct. 18, 2002   (JP) .............................. 2002-304934

(51) Int. Cl.
*B23P 17/00* (2006.01)
(52) U.S. Cl. ................................. 29/894.362
(58) Field of Classification Search .......... 29/894.362, 29/894.361, 894.36; 82/1.11; 384/448, 384/544, 537
See application file for complete search history.

(56) References Cited

U.S. PATENT DOCUMENTS

| 5,842,388 | A | 12/1998 | Visser et al. |
| 6,071,180 | A | 6/2000 | Becker |
| 6,364,426 | B1 | 4/2002 | Horne et al. |
| 6,415,508 | B1 | 7/2002 | Laps |
| 2002/0066185 | A1 | 6/2002 | Loustanau et al. |

FOREIGN PATENT DOCUMENTS

| EP | 1 103 327 A1 | 5/2001 |
| JP | 11-83881 A | 3/1999 |
| JP | 2000-227132 A | 8/2000 |
| JP | 2001-259902 A | 9/2001 |
| JP | 2001-318105 A | 11/2001 |
| JP | 2002-347406 A | 12/2002 |
| WO | WO 98/38436 A1 | 9/1998 |
| WO | WO 00/74883 A1 | 12/2000 |
| WO | WO 01/38025 A1 | 5/2001 |

*Primary Examiner*—Lenard A. Footland
(74) *Attorney, Agent, or Firm*—Sughrue Mion Pllc.

(57) ABSTRACT

Respective constituent members of a wheel bearing unit 5 are assembled and also a cover 74 is fixed to an inner end portion of an outer ring 6. The wheel bearing unit 5 is fitted to a turning machine 38 in a state that a space in which an encoder 72 is provided is sealed tightly from an outside by fitting a stop plug 96 into an insertion hole 84 provided in the cover 74. A top end portion of a rotating shaft 40 of a turning machine 38 is engaged with an engaged concave portion 102 provided to a hub 8*a*. A turning process is applied to an outer side surface of a rotary flange 13 while turning the hub 8*a* around the outer ring 6 by the rotating shaft 40, and thus the outer side surface is processed in predetermined shape and dimension.

5 Claims, 19 Drawing Sheets

BEARING UNIT FOR WHEEL AND METHOD OF MANUFACTURING THE BEARING UNIT

TECHNICAL FIELD

The present invention relates to a wheel bearing unit for supporting rotatably a wheel on a suspension system in a state that such bearing unit bears and fixes a braking rotation body such as a rotor, a drum, or the like, and improvements in a method of manufacturing such wheel bearing unit.

BACKGROUND ART

According to a configuration shown in FIG. 21, for example, a wheel 1 constituting a wheel of a car and a rotor 2 constituting a disc brake as a braking system are supported rotatably on a knuckle 3 constituting a suspension system. More particularly, an outer ring 6 as a stationary ring, which constitutes a wheel bearing unit 5, is fitted into a circular bearing hole 4 formed in the knuckle 3 and then fixed by a plurality of bolts 7. Meanwhile, the wheel 1 and the rotor 2 are coupled/fixed to a hub 8, which constitutes the wheel bearing unit 5, by a plurality of studs 9 and nuts 10.

Double row outer ring raceways 11a, 11b serving as a stationary raceway respectively are formed on an inner peripheral surface as a stationary peripheral surface of the outer ring 6, and a stationary flange 12 is formed on an-outer peripheral surface. Such outer ring 6 is fixed to the knuckle 3 by coupling the stationary flange 12 to the knuckle 3 via the bolts 7.

In contrast, a rotary flange 13 is formed on a part of an outer peripheral surface of the hub 8, which is projected from an outer end opening of the outer ring 6 (Here, the outside in the axial direction means the outside portion in the width direction in a fitted state to a car, and corresponds to the left side in respective FIGS. except FIGS. 2 3, 6, 7, 9, 18. In contrast, the right side in respective FIGS. except FIGS. 2 3, 6, 7, 9, 18, which is located on the center side in the width direction in a fitted state to a car, is defined as the inside in the axial direction). The wheel 1 and the rotor 2 are coupled/fixed to one side surface (an outer side surface in an illustrated example) of the rotary flange 13 by the studs 9 and nuts 10. Also, an inner ring raceway 14a as the rotary raceway is formed on a middle portion of an outer peripheral surface of the hub 8 to oppose to the outside outer ring raceway 11a out of the double row outer ring raceways 11a, 11b. Then, an inner ring 16 constituting a rotating member 23 as a rotary ring together with the hub 8 is fitted onto a small-diameter stepped portion 15 that is formed on an outer peripheral surface of an inner end portion of the hub 8. Then, an inner ring raceway 14b is formed on an outer peripheral surface of the inner ring 16 as the rotary raceway to oppose to the inside outer ring raceway 11b out of the double row outer ring raceways 11a, 11b. Here, the outer peripheral surfaces of the hub 8 and the inner ring 16 correspond to a rotary peripheral surface set forth in claims.

A plurality of balls 17, 17 serving as a rolling element respectively are provided rollably between the outer ring raceways 11a, 11b and the inner ring raceways 14a, 14b in a state that these balls are held by cages 18, 18 respectively. According to this configuration, a double row angular contact ball bearing can be constructed in a back-to-back arrangement style, and thus the rotating member 23 is borne rotatably on the inside of the outer ring 6 to support the radial load and the thrust load. Then, seal rings 19a, 19b for isolating an internal space 26, in which the balls 17, 17 are provided, from the outside are provided between inner peripheral surfaces of both end portions of the outer ring 6 and the outer peripheral surface of the middle portion of the hub 8 and the outer peripheral surface of the inner end portion of the inner ring 16 respectively. Then, since an illustrated example gives the wheel bearing unit 5 that supports the driven wheel (the rear wheel of the FR car and the RR car, the front wheel of the FF car, all wheels of the 4WD car), a spline hole 20 is formed in the center portion of the hub 8. Then, a spline shaft 22 of a constant velocity joint 21 is inserted into this spline hole 20.

In using such wheel bearing unit 5, as shown in FIG. 21, the outer ring 6 is fixed to the knuckle 3 and also the wheel 1, on which a tire (not shown) is fitted, and the rotor 5 are fixed to the rotary flange 13 of the hub 8. Also, a combination of the rotor 2 and a support member and a caliper (both not shown) fixed to the knuckle 3 constitutes the braking disc brake. In the braking operation, a pair of pads that are provided to put the rotor 2 therebetween are pushed against both side surfaces of the rotor 2 serving as braking friction surfaces. Here, in this specification, the braking friction surface signifies a side surface of the rotor in the axial direction when the braking rotation body is composed of the rotor, while the braking friction surface signifies an inner peripheral surface of the drum when the braking rotation body is composed of the drum.

Meanwhile, it is known that the vibration called the shudder that entails an unpleasant noise is often generated in the braking operation of the car. As the cause of such vibration, various factors such as an uneven friction condition between a side surface of the rotor 2 and a lining of the pad, and the like are known. Also, it is known that the run-out of the rotor 2 acts as the major cause. In other words, the side surface of the rotor 2 must be set essentially at a right angle to a center of rotation of the rotor 2, nevertheless it is difficult to make a complete right angle due to the inevitable manufacturing error, and so on. As a result, it is inevitable that, though its amount is quite small, the side surface of the rotor 2 swings in the rotating shaft direction (the lateral direction in FIG. 21) during the running of the car. In case such swing (an amount of displacement in the lateral direction in FIG. 21) is increased, the shudder is caused when the linings of a pair of pads are thrust against both side surfaces of the rotor 2 to brake. Also, in case the drum constituting the drum brake is fixed to the side surface of the rotary flange 13, the vibration like the shudder is also caused when the brake shoes are pushed against the inner peripheral surface in the situation that this inner peripheral surface of the drum is not completely parallel with a center of rotation of the drum.

In order to suppress the shudder generated due to such causes, it is important to suppress (improve) the swing of the side surface of the rotor 2 in the axial direction (axial swing) or the swing of the inner peripheral surface of the drum in the radial direction. For example, in Patent Literatures 1, 2, a method of manufacturing the wheel bearing unit that takes account of the swing of the braking friction surface of the braking rotation body such as the rotor 2, or the like is set forth. In the case of the method of manufacturing the wheel bearing unit set forth in Patent Literature 1, when one side surface of the rotary flange provided to the outer peripheral surface of the hub is processed into predetermined shape and dimension, first respective constituent members of the wheel bearing unit including the hub whose one side surface is not processed yet are assembled. Then, while rotating the hub by the spindle that is inserted into the inside of the hub in the situation that the end portion of the outer ring is clamped by the chuck of the processing machine, one side surface of the rotary flange provided to the outer peripheral surface of this hub is finished to the predetermined shape and dimension by putting the grinding tool onto this one side surface. In the case where the wheel bearing unit is manufactured by such method, a perpendicularity of one side surface of the rotary flange to a center of rotation of the hub can be improved irrespective of a dimensional error or an assembling error that is inevitable in manufacturing respective constituent members. Thus, the swing of the braking friction surface of the braking rotation body such as the rotor, or the like fixed to this one side surface can be suppressed to some extent.

Also, in the case of the method of manufacturing the wheel bearing unit set forth in Patent Literature 2, the hub is rotated by the spindle that is inserted into the inside of this hub in the situation that the rotor is fixed to one side surface of the rotary flange provided to the outer peripheral surface of the hub. Then, while rotating the hub, respective portions are finished into predetermined shape and dimension by putting the cutting tool onto both side surfaces of the rotor and a portion of the outer peripheral surface of the hub, onto which the inner ring is fitted. In the case where the wheel bearing unit is manufactured by such method, a perpendicularity of the braking friction surface provided to both side surfaces of the rotor to a center of rotation of the hub can be improved regardless of the dimensional error or the assembling error that is inevitable in manufacturing respective constituent members. Thus, the swing of this rotor can be suppressed to some extent. In this case, as the prior art literatures that are associated with the present invention, there exist Patent Literatures 3 to 8 in addition to above Patent Literatures 1, 2.

[Patent Literature 1]
U.S. Pat. No. 6,415,508 Specification
[Patent Literature 2]
U.S. Pat. No. 5,842,388 Specification
[Patent Literature 3]
JP-A-2000-227132 Gazette
[Patent Literature 4]
JP-A-2001-318105 Gazette
[Patent Literature 5]
JP-A-11-83881 Gazette
[Patent Literature 6]
U.S. Pat. No. 6,364,426 Specification
[Patent Literature 7]
U.S. Pat. No. 6,071,180 Specification
[Patent Literature 8]
U.S. patent application Publication No. 2002/0066185 Specification In recent years, in order to get a rotation speed signal used to operate the anti-lock brake system (ABS) or the traction control system (TCS), the rotation speed sensing device is incorporated into the above wheel bearing unit. For example, in the configuration shown in FIG. 21, in some case an encoder consisting of a permanent magnet is fitted/fixed onto an end portion of the inner ring 16 rotated together with the wheel, and also a rotation speed sensor is fitted to either the outer ring 6 or a part of the member such as the knuckle 3, or the like fixed to this outer ring 6 such that a sensing portion of the sensor opposes to a sensed portion of the encoder. In such configuration, from a viewpoint of assuring a sensing performance (reliability) of the rotation speed sensor, it is necessary to prevent the foreign matter such as a magnetic powder, or the like from adhering the sensed portion of the encoder. In contrast, in the case of the method of manufacturing the wheel bearing unit set forth in above Patent Literatures 1, 2, it is not considered at all that the encoder is fixed to the hub constituting the rotating member or the inner ring. For this reason, a following disadvantage ① is caused when the encoder is provided to the wheel bearing unit set forth in above Patent Literatures 1, 2.

① Upon grinding or cutting either one side surface of the rotary flange or the braking friction surface of the braking rotation body such as the rotor, or the like couple/fixed to this one side surface to improve a perpendicularity of the braking friction surface of the rotor to the center of rotation of the hub, it is possible that chips as the magnetic material generated by this grinding or cutting adhere to the sensed portion of the encoder. In case the chips adhere in this manner, a sensing performance of the rotation speed sensor becomes worse in the wheel bearing unit into which the rotation speed sensing device is incorporated.

Also, in the case of the method of manufacturing the wheel bearing unit set forth in above Patent Literatures 1, 2, a following disadvantage ② is present respectively.

② First, in the case of the configuration set forth in above Patent Literature 1, there exists the dimensional error or the assembling error that is inevitable in manufacturing between the side surface of the rotary flange provided to the outer peripheral surface of the hub and the side surface of the braking rotation body such as the rotor, or then like fixed to this side surface. Therefore, it is difficult to say that the swing of the braking friction surface of the braking rotation body can be suppressed satisfactorily. Then, in the case of the method of manufacturing the wheel bearing unit set forth in above Patent Literature 2, there exists the dimensional error or the assembling error that is inevitable in manufacturing a plurality of parts that are located between the knuckle constituting the suspension system and the portion, on which the inner ring is fitted, of the outer peripheral surface of the hub. Therefore, it is also difficult to say that the swing of the side surface of the braking rotation body can be suppressed satisfactorily. Here, in Patent Literature 3, the measure to regulate a degree of instability of the side surface of the rotor fixed to the rotary flange, which is provided to the outer peripheral surface of the hub, while the hub constituting the wheel bearing unit is rotated around the outer ring is set forth. However, in this Patent Literature 3, a method of manufacturing the wheel bearing unit in which a degree of instability of the side surface is regulated is not set forth at all.

DISCLOSURE OF THE INVENTION

In light of such circumferences, a wheel bearing unit and a method of manufacturing the same of the present invention have been invented to overcome at least the disadvantage ① out of the above disadvantages ①②.

Out of the wheel bearing units and the methods of manufacturing the same of the present invention, like the foregoing wheel bearing unit in the prior art, a wheel bearing unit set forth in claims 1 and 2 includes a stationary ring that has a stationary raceway on a stationary peripheral surface and is not rotated in operation, a rotary ring that has a rotary raceway on a rotary peripheral surface and is rotated in operation, a plurality of rolling elements provided between the stationary raceway and the rotary raceway, and a rotary flange provided to an outer peripheral surface of the rotary ring. Also, the wheel bearing unit couples/supports a braking rotating body having a braking friction surface against which a friction material is pushed in a braking operation onto a side surface of the rotary flange at least in operation.

In particular, in the wheel bearing unit set forth in claim 1, an encoder which is fixed to a part of the rotary ring and at least a part of which is made of a permanent magnet is provided. Also, the side surface of the rotary flange is processed into predetermined shape and dimension while rotating the rotary ring around the stationary ring in a state that the stationary ring, the rotary ring, and the plurality of rolling elements are assembled together and also a space in which the encoder is provided is isolated from an outside by fitting a stop plug or a cover to a part of the stationary ring or the rotary ring directly or via other member. Also, the stop plug or the cover is removed from the stationary ring or the rotary ring after the side surface of the rotary flange is processed into predetermined shape and dimension but before the wheel bearing unit is fitted to a suspension system.

Also, in the wheel bearing unit set forth in claim 2, an encoder which is fixed to a part of the rotary ring and at least a part of which is made of a permanent magnet is provided. Also, the braking friction surface of the braking rotating body is processed into predetermined shape and dimension while rotating the rotary ring that couples/supports the braking rotating body around the stationary ring in a state that the stationary ring, the rotary ring, and the plurality of rolling elements are assembled together and also a space in which the encoder is provided is isolated from an outside by fitting a stop plug or a cover to a part of the stationary ring or the rotary ring directly or via other member. Also, the stop plug or the cover is removed from the stationary ring or the rotary ring after the braking friction surface is processed into predetermined shape and dimension but before the wheel bearing unit is fitted to a suspension system.

In addition, in a method of manufacturing a wheel bearing unit set forth in claim 4 that corresponds to a method of manufacturing the wheel bearing unit according to claim 1, the side surface of the rotary flange is processed into predetermined shape and dimension while rotating the rotary ring around the stationary ring in the state that the stationary ring, the rotary ring, and a plurality of rolling elements are assembled together and also the space in which the encoder is provided is isolated from the outside by fitting the stop plug or the cover to a part of the stationary ring or the rotary ring directly or via other member. Then, the stop plug or the cover is removed from the stationary ring or the rotary ring before the wheel bearing unit is fitted to the suspension system.

Further, in a method of manufacturing a wheel bearing unit set forth in claim 5 that corresponds to a method of manufacturing the wheel bearing unit according to claim 2, the braking friction surface of the braking rotating body is processed into predetermined shape and dimension while rotating the rotary ring that couples/supports the braking rotating body around the stationary ring in a state that the stationary ring, the rotary ring, and the plurality of rolling elements are assembled together and also the space in which the encoder is provided is isolated from the outside by fitting the stop plug or the cover to a part of the stationary ring or the rotary ring directly or via other member. Then, the stop plug or the cover is removed from the stationary ring or the rotary ring before the wheel bearing unit is fitted to the suspension system.

According to the wheel bearing unit and the method of manufacturing the same of the present invention constructed as above, in order to improve a perpendicularity or a parallelism of the braking friction surface to a center of rotation of the rotary ring in the configuration in which the encoder is fitted to the rotary ring, either the side surface of the rotary flange or the braking friction surface is processed into the predetermined shape and dimension in a state that the constituent members including the rotary ring and the encoder are assembled, nevertheless it can be prevented that the chips generated in this process adhere to the sensed portion of the encoder. Therefore, a sensing performance (reliability) of the rotation speed sensor that is opposed to the sensed portion can be ensured sufficiently. Also, since the stop plug or the cover is removed from a part of the stationary ring or the rotary ring immediately before the wheel bearing unit is fitted to the suspension system, adhesion of the foreign matter such as the magnetic powder, or the like onto the sensed portion can be prevented from this fitting of the stop plug or the cover to this removal while the wheel bearing unit is carried, or the like. Also, since the stop plug or the cover is removed from the stationary ring or the rotary ring after the side surface of the rotary flange or the braking friction surface is processed but before the wheel bearing unit is fitted to the suspension system, such stop plug or such cover offers no obstruction to the operation of assembling the rotation speed sensor into the wheel bearing unit or fitting the wheel bearing unit to the vehicle.

In this event, in Patent Literature 4, such a configuration is set forth that the cover formed like a bottomed circular cylinder is fitted/fixed onto the inner end portion of the outer ring as the stationary ring and also the space in which the encoder is provided is isolated from the outside by fitting the detachable stop plug into the insertion hole provided in a part of the cover. Also, in Patent Literature 5, such a configuration is set forth that the space in which the encoder is provided is isolated from the outside by fitting the detachable stop plug into the insertion hole provided in a part of the outer ring as the stationary ring. However, in both of above Patent Literature 4, 5, such an approach is not set forth that either the side surface of the rotary flange or the braking friction surface of the braking rotation body fixed to this side surface is processed into the predetermined shape and dimension while rotating the rotary ring with respect to the stationary ring in the situation that the stationary ring, the rotary ring, and a plurality of rolling elements are assembled and then the space in which the encoder is provided is isolated from the outside by fitting the stop plug into a part of the stationary ring or the rotary ring directly or via other member. Also, in both of above Patent Literature 4, 5, such an approach is not set forth that the stop plug is removed from the stationary ring or the rotary ring after either the side surface of the rotary flange or the braking friction surface is processed into the predetermined shape and dimension but before the wheel bearing unit is fitted to the suspension system.

In addition, according to the wheel bearing unit set forth in claim 2 and a method of manufacturing the wheel bearing unit set forth in claim 5, when the braking friction surface of the braking rotation body is processed in the predetermined shape and dimension, such an event can be eliminated that the dimensional error or the assembling error that is inevitable in manufacturing a plurality of parts that are located between a part of the suspension system and the braking rotation body leads to the worsening of a perpendicularity or a parallelism of the braking friction surface to a center of rotation of the rotating shaft. Therefore, the swing of the braking friction surface can be suppressed sufficiently. Also, since there is no necessity to improve particularly a dimensional accuracy of a plurality of parts, a cost required to suppress the swing of the braking friction surface can be suppressed sufficiently low.

Figure 1:
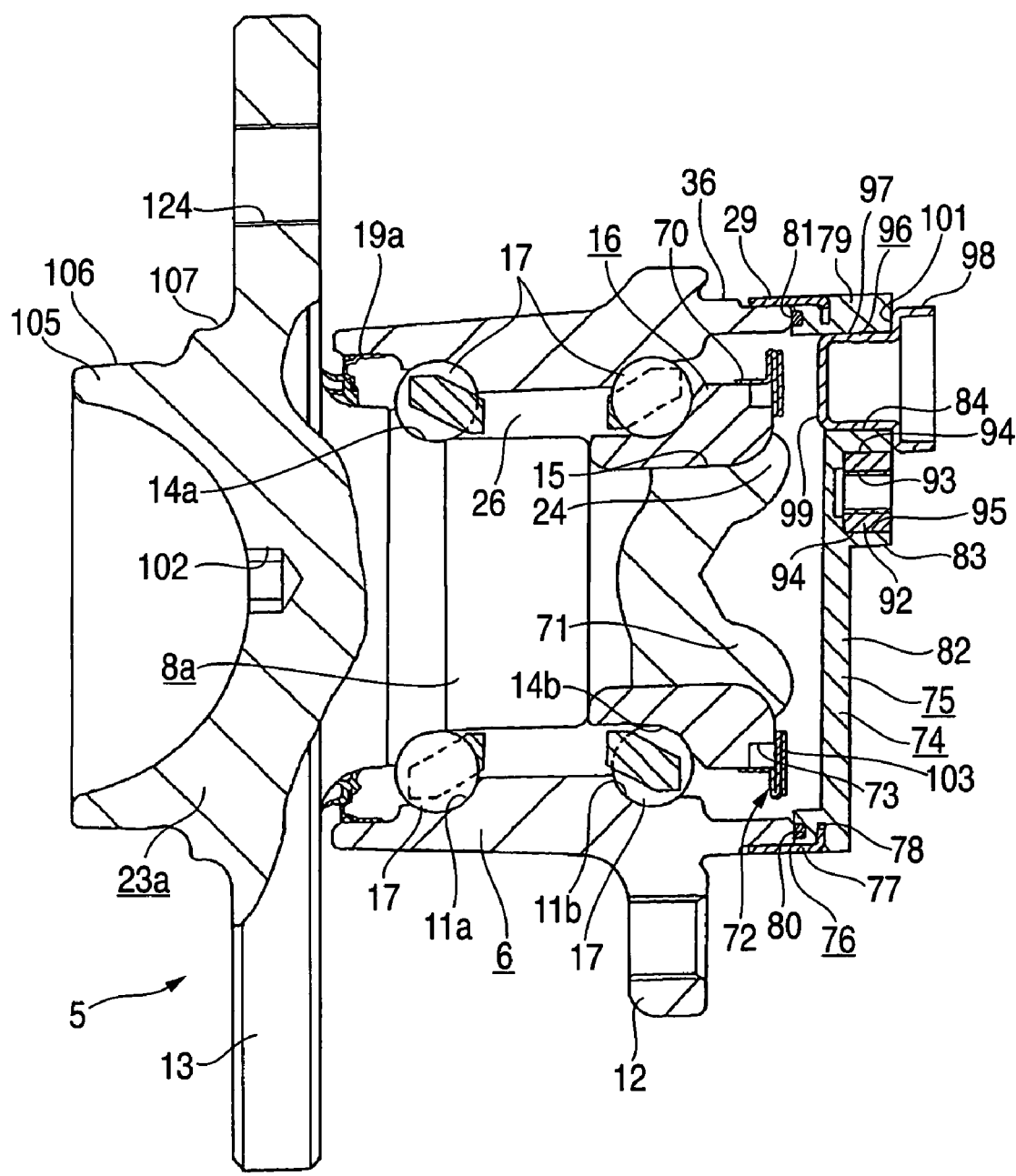
FIG. 1 is a sectional view showing a first embodiment of the present invention in a state that a cover is fixed to an inner end portion of an outer ring and also a stop plug is inserted/fixed into an insertion hole provided in this cover.

In above FIGS., a reference numeral 1 denotes a wheel, 2 rotor, 3 knuckle, 4 bearing mounting hole, 5 wheel bearing unit, 6, 6a, 6b, 6c outer ring, 7 bolt, 8, 8a, 8b hub, 9 stud, 10 nut, 11a, 11b outer ring raceway, 12, 12a stationary flange, 13 rotary flange, 14a, 14b inner ring raceway, 15 small-diameter stepped portion, 16, 16a, 16b inner ring, 17 ball, 18 cage, 19a, 19b seal ring, 20 spline hole, 21 constant velocity joint, 22 spline shaft, 23, 23a, 23b rotating member, 24 caulked portion, 25 fitting hole, 26 internal space, 27 slinger, 28 encoder, 29 small-diameter stepped portion, 30, 30a to 30f cover, 31 cylinder portion, 32 bottom plate portion, 33 threaded hole, 34 through hole, 35 tentatively setting screw, 36 large-diameter circular cylinder portion, 37 stepped surface, 38, 38a, 38b turning machine, 39 chuck, 40, 40a rotating shaft, 41a, 41b, 41c precision machining tool, 42 reinforcing member, 43 elastic member, 44 fitting portion, 45 through hole, 46 circular ring portion, 47 cylinder portion, 48 curved portion, 49 hydraulic cylinder, 50 fitted cylinder portion, 51 pressing collar portion, 52 projected portion, 53 female spline portion, 54 cylinder portion, 55 latching collar portion, 56 insertion hole, 57 cover, 58 outer-diameter-side cylinder portion, 59 collar portion, 60 inner-diameter-side cylinder portion, 61 stop plug, 62 large-diameter-side cylinder portion, 63 small-diameter-side cylinder portion, 64 stepped portion, 65 bottom plate portion, 66 annular piston, 67 taper portion, 68 lip portion, 69 outer-diameter-side cylinder portion, 70 supporting ring, 71 cylinder portion, 72 encoder, 73 small-diameter stepped portion, 74 cover, 75 main body, 76 fitting cylinder, 77 fitting cylinder portion, 78 inward-directed collar portion, 79 cylinder wall portion, 80 fitting groove, 81 O ring, 82 bottom plate portion, 83 projected portion, 84 insertion hole, 85 holder, 86 inserted portion, 87 fitting flange portion, 88 harness, 89 fitting groove, 90 through hole, 91 core metal, 92 nut, 93 internal thread portion, 94 engaging teeth, 95 circular hole, 96 stop plug, 97 small-diameter cylinder portion, 98 large-diameter cylinder portion, 99 bottom plate portion, 100 projected stripe portion, 101 stepped portion, 102 engaging concave portion, 103 encoder main body, 104 precision machining tool, 105 cylinder portion, 106 small-diameter cylinder portion, 107 large-diameter cylinder portion, 108 encoder, 109 insertion hole, 110 stop plug, 111 fitting portion, 112 stopper portion, 113 knob portion, 114 cylinder portion, 115 bottom plate portion, 116 chamfered portion, 117 small-diameter cylinder portion, 118 large-diameter cylinder portion, 119 stepped portion, 120 bottom plate portion, 121 taper portion, 123 taper portion, 124 threaded hole, and 125 projected portion.

BEST MODE FOR CARRYING OUT THE INVENTION

FIGS. 1 to 4 show a first embodiment of the present invention, which corresponds to claims 1, 3, 4, and 6. In the wheel bearing unit 5 produced by the manufacturing method in this example, the stationary flange 12 used to couple/fix the outer ring 6 to the knuckle 3 (see FIG. 21) is provided to the middle portion of the outer peripheral surface of the outer ring 6 as the stationary ring. Also, the double row outer ring raceways 11a, 11b serving as the stationary side raceway respectively are formed on the inner peripheral surface as the stationary peripheral surface of the outer ring 6. Also, a small-diameter stepped portion 29 is formed on an inner half portion, which is deviated inward from the inner side surface of the stationary flange 12, of the outer peripheral surface of the outer ring 6.

Also, the inner ring raceways 14a, 14b serving as the rotary raceway respectively are formed on portions, which oppose to the outer ring raceways 11a, 11b, of the outer peripheral surfaces as the rotary peripheral surfaces of a hub 8a and the inner ring 16 constituting a rotating member 23a as the rotary ring respectively. In other words, the inner ring raceway 14a is formed directly on the middle portion of the outer peripheral surface of the hub 8a, and also the inner ring 16 on the outer peripheral surface of which the inner ring raceway 14b is formed is fitted onto the small-diameter stepped portion 15 formed on the innermost portion of the hub 8a. Also, in order to prevent that the inner ring 16 gets out of the small-diameter stepped portion 15, a caulked portion 24 is formed on the inner end portion of the hub 8a. In other words, the inner ring 16 is fitted onto the small-diameter stepped portion 15 and then the caulked portion 24 is formed by plastically deforming a cylinder portion 71, which is provided to the inner end portion of the hub 8a to protrude from the inner end surface of the inner ring 16, outward in the radial direction. Thus, the inner end surface of the inner ring 16 is pressed by the caulked portion 24. According to this configuration, the inner ring 16 is fitted/fixed onto the inner end portion of the hub 8a. Then, a plurality of balls 17, 17 serving as the rolling element respectively are provided rollably between the outer ring raceways 11a, 11b and the inner ring raceways 14a, 14b.

Figure 21:
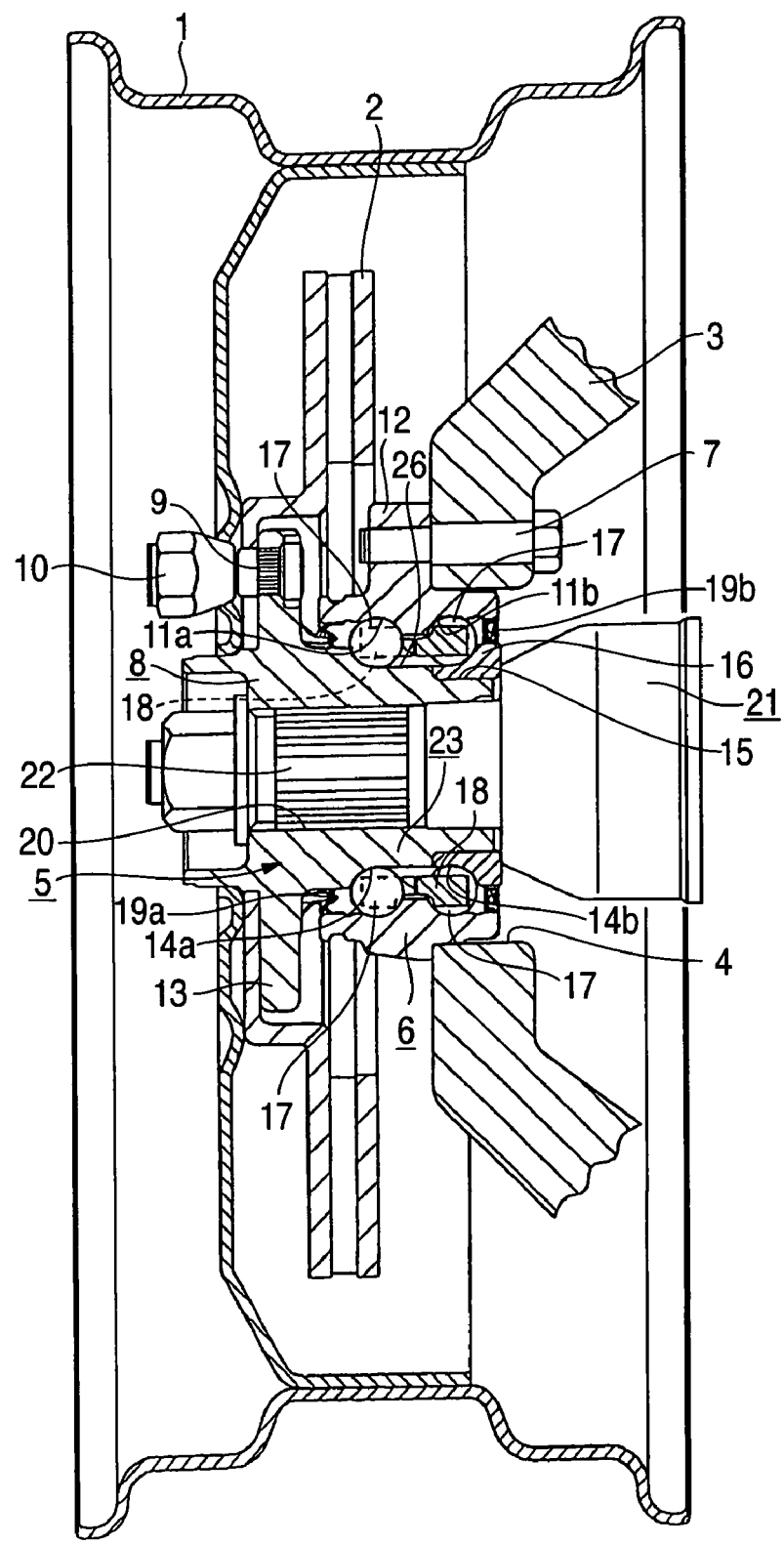
FIG. 21 is a sectional view showing a first embodiment of a fitted state of a wheel bearing unit as a subject of the present invention.

Also, unlike the case of the conventional structure shown in above FIG. 21, the wheel bearing unit in the present embodiment is used to bear the wheel used to as the nondriven wheel (the front wheel of the FR car and the RR car, the rear wheel of the FF car). For this reason, the spline hole 20 (see FIG. 21) that passes through the hub 8a in the axial direction is not formed in the hub 8a.

Also, the rotary flange 13 to which the wheel 1 (FIG. 21) constituting the wheel and the rotor 2 as the braking rotation body are fixed is provided to a near-outer-end portion of an outer peripheral surface of the hub 8a, which is projected from an outer end opening of the outer ring 6. A threaded hole 124 is formed at plural locations in the circumferential direction of the rotary flange 13 respectively on the same circumference that has a center of rotation of the hub 8a as its center. Then, thread portions provided to front half portions of a plurality of studs (not shown) can be screwed into these threaded holes 124 respectively. The wheel 1 and the rotor 2 (see FIG. 21) are held between head portions provided to based end portions of respective studs and the outer side surface of the rotary flange 13 in the situation that respective studs are screwed into respective threaded holes 124. With this configuration, unlike the case of the conventional structure shown in above FIG. 21, the nuts are not needed to couple/fix the wheel 1 and the rotor 2 to the rotary flange 13 (see FIG. 13). Also, it is possible to prevent the situation that the studs will be a hindrance in the turning operation of the outer side surface of the rotary flange 13 or the outer side surface is distorted when the studs are press-fitted/fixed to the inside of the fitting hole. Also, in the case of this embodiment, an engaged concave portion 102 with which a top end portion of a rotating shaft 40 (FIG. 4) of a turning machine 38 described later is engaged is formed on the inside of a center portion of an outer end surface of the hub 8a. This engaged concave portion 102 has a hexagonal cross section and is formed by the forging.

Meanwhile, an encoder 72 is fitted/fixed onto the inner end portion of the inner ring 16. This encoder 72 has a supporting ring 70 and an encoder main body 103. The supporting ring 70 is formed like an annular ring having an almost T-shaped cross section as a whole by folding a magnetic metal plate such as a SPCC, or the like, and then is fitted/fixed onto the inner end portion of the inner ring 16 as an interference fit. Then, the encoder main body 103 is attached to the inner side surface of the supporting ring 70 by bonding, or the like. This encoder main body 103 is made of a rubber into which ferrite powders are mixed, for example, and is magnetized in the axial direction. Also, the magnetizing direction is changed alternately at an equal interval in the circumferential direction. Thus, the S pole and the N pole are arranged alternately at an equal interval in the circumferential direction on the inner side surface of the encoder main body 103. The reason why the supporting ring 70 is formed to have the almost T-shaped cross section as mentioned above is that magnetized areas of respective magnetic poles (the N pole and the S pole) of the encoder main body 103 is increased by reducing an inner diameter of the encoder main body 103 smaller than an outer diameter of a shoulder portion of the inner ring 16. Thus, magnetic flux density at the rotation speed sensor using the encoder main body 103 as the sensed portion can be improved because the magnetized areas of respective magnetic poles of the encoder main body 103 are increased.

In the case of the present embodiment, a small-diameter stepped portion 73 is formed on the outer peripheral surface of the inner end portion of the inner ring 16. Since the small-diameter stepped portion 73 is formed, the distortion of the inner ring raceway 14b provided on the outer peripheral surface of the inner ring 16 can be prevented independently of an outward-directing force that is applied to the inner end portion of the inner ring 16 when the cylinder portion 71 provided to the inner end portion of the hub 8a is plastically deformed outward in the diameter direction. In this case, if the distortion of the shape of the small-diameter stepped portion 73 is small, the supporting ring 70 can also be fitted onto the small-diameter stepped portion 73.

Also, in the case of the present embodiment, the seal ring 19a is provided between the inner peripheral surface of the outer end portion of the outer ring 6 and the outer peripheral surface of the middle portion of the hub 8a. In contrast, a cover 74 is put on the opening portion of the inner end of the outer ring 6. The cover 74 consists of a main body 75 formed like a cylinder with a bottom by the injection molding of synthetic resin, and a fitting cylinder 76 coupled to the opening portion of the main body 75. The fitting cylinder 76 is formed by plastically deforming a metal plate such as a stainless steel plate, or the like having a corrosion resistance. This fitting cylinder 76 consists of a fitting cylinder portion 77 formed like an annular ring as a whole to have an L-shaped cross section, and an inward-directed collar portion 78 folded inward from a base end edge of the fitting cylinder portion 77 in the diameter direction. Such fitting cylinder 76 is coupled to an opening portion of the main body 75 by molding the inward-directed collar portion 78 onto the end portion of the opening of the main body 75 at the time of the injection molding of the main body 75.

The cover 74 constructed as above is fitted/fixed onto the small-diameter stepped portion 29 of the outer ring 6, on the inner end portion of which the fitting cylinder portion 77 is provided, as an interference fit. Also, an end surface of the opening portion of the main body 75, i.e., a top end portion of a cylinder wall portion 79 formed on an outer edge portion of the main body 75 is brought into contact with the inner end surface of the outer ring 6 in this condition. A fitting groove 80 is formed on the top end surface of the cylinder wall portion 79 around the entirety of a circumference, and then an O ring 81 is fitted into the fitting groove 80. In the condition that the top end surface of the cylinder wall portion 79 comes into contact with the inner end surface of the outer ring 6, this O ring 81 is elastically compressed between this inner end surface and a bottom surface of the fitting groove 80 to tightly seal the couple portion between the cover 74 and the outer ring 6.

Also, a projected portion 83 that is projected in the axial direction is provided to a part of an inner side surface, which is deviated outward partially (the upper portion in FIGS. 1 and 4) in the diameter direction, of a bottom plate portion 82 of the main body 75 constituting the cover 74. Also, an insertion hole 84 is provided in a portion of the bottom plate portion 82, which corresponds to the projected portion 83 and opposes to an inner side surface of the encoder 72, to pass through the bottom plate portion 82 in the axial direction. Thus, an inserted portion 86 of a holder 85 (FIG. 3) for holding the rotation speed sensor can be inserted into the insertion hole 84.

This holder 85 contains the rotation speed sensor in a synthetic resin.

This holder 85 contains the rotation speed sensor in a synthetic resin. This rotation speed sensor consists of an IC into which a magnetic sensing element such as a magnetoresistance element (MR element), or the like whose characteristic is changed in response to a flow direction and magnetic of a magnetic flux and a waveform shaping circuit for shaping an output waveform of this magnetic sensing element are incorporated, a pole piece made of magnetic material to guide the magnetic flux to the magnetic sensing element, and the like. Also, the holder 85 has the inserted portion 86 at its near- top-end portion and a fitting flange portion 87 at its base end portion respectively. A sensing portion of the rotation speed sensor is positioned on the top end surface portion of the inserted portion 86. Also, an end portion of a harness 88 for supplying an output signal, which is output as a shaped waveform from the IC, to a controller (not shown) is connected to the holder 85 directly (without the intervention of the connector, or the like).

Also, a fitting groove 89 is formed on an outer peripheral surface of a middle portion of the inserted portion 86, and then the O ring (not shown) is fitted in the fitting groove 89. When the inserted portion 86 is inserted into the insertion hole 84, this O ring is elastically compressed between an inner peripheral surface of the insertion hole 84 and a bottom surface of the fitting groove 89 to prevent the foreign matter such as a muddy water, or the like from entering into the cover 74 through this insertion area.

Also, an outer side surface of the fitting flange portion 87 provided to the base end portion of the holder 85 must come into contact with an end portion of the projected portion 83 provided to the cover 74, so that mutual contact surfaces of both portions 87, 83 are formed as a flat surface respectively. Also, a through hole 90 is formed in a top end portion (a lower end portion in FIG. 3) of the fitting flange portion 87, and then a cylindrical core metal 91 is inserted into the inside of the through hole 90.

Meanwhile, a nut 92 is embedded in a part of the end portion of the projected portion 83 provided to the cover 74, which is aligned with the through hole 90 provided in the holder 85 in a state that the inserted portion 86 provided in the holder 85 is inserted into the insertion hole 84 provided in the cover 74. An internal thread portion 93 is formed on an inner peripheral surface of the nut 92, and a plurality of engaging teeth 94, 94 are formed on an outer peripheral surface of the nut 92. Then, this nut 92 is fixed to the cover 74 by pushing the nut 92 into a bottomed circular hole 95 in a heated state. This circular hole 95 is provided beforehand to a part of the end surface of the projected portion 83 and has an inner diameter that is slightly smaller than a diameter of a circumscribed circle of the nut 92. In this case, this nut 92 may be fixed to the cover 74 by molding it together with this cover 74 in the injection molding.

In operation of the wheel bearing unit 5, the sensing portion of the rotation speed sensor that is provided to the holder 85 held on the cover 74 is opposed to the inner side surface as the sensed portion of the encoder 72 via a small clearance. Thus, the output signal of the rotation speed sensor, which is changed in response to the rotation speed of the rotation speed, can be output via the harness 88. Such encoder 72 and the rotation speed sensor constitute a rotation speed sensing unit that senses the rotation speed of the wheel fixed to the hub 8a.

Figure 2:
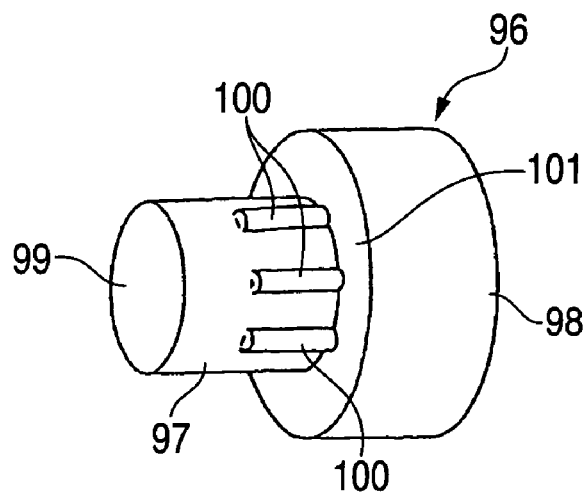
FIG. 2 is a perspective view showing only the stop plug.
Figure 3:
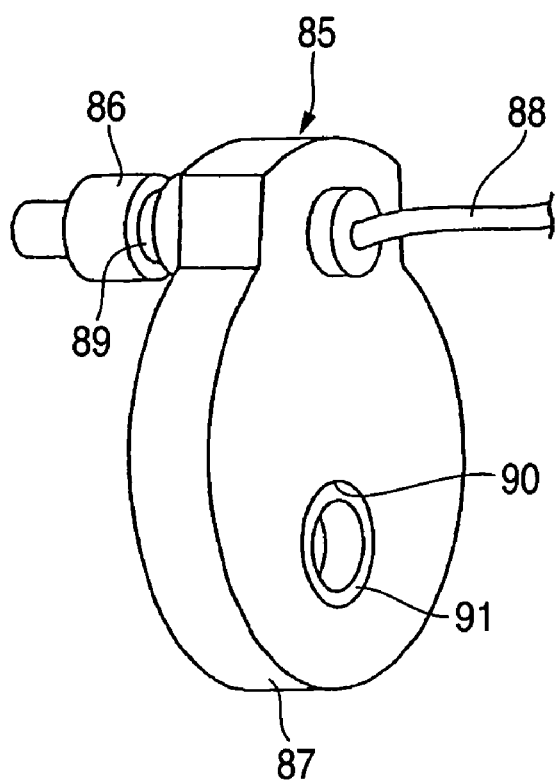
FIG. 3 is a perspective view of a holder that is fitted to a structure in the first embodiment.

In particular, in the case of the wheel bearing unit of the present invention, a stop plug 96 shown in detail in FIG. 2 can be detachably attached into the insertion hole 84 that is provided in the cover 74 to receive the inserted portion 86 of the holder 85. This stop plug 96 is formed of an inexpensive synthetic resin such as polypropylene (PP), polyethylene terephthalate (PET), or the like by using the injection molding. The stop plug 96 has a small-diameter cylinder portion 97 as the fitted portion, and a large-diameter cylinder portion 98. One end of the small-diameter cylinder portion 97 out of them is covered with a bottom plate portion 99 (the left end in FIGS. 1 and 2). Also, projected stripe portions 100, 100 each extended in the axial direction are provided at plural locations on an outer peripheral surface of a base half portion (a right half portion in FIGS. 1 and 2) of the small-diameter cylinder portion 97 in the circumferential direction. Because a diameter of a circumscribed circle of these plural projected stripe portions 100, 100 in their free condition is set slightly larger than an inner diameter of the insertion hole 84, the small-diameter cylinder portion 97 can be fitted into the insertion hole 84 by means of an interference fit. Also, the stop plug 96 can be positioned to the cover 74 by a stepped portion 101 that connects the small-diameter cylinder portion 97 and the large-diameter cylinder portion 98.

Here, the stop plug 96 may be formed of other elastic material such as an elastomer like a rubber, or the like in addition to the above synthetic resin.

Also, in the case of the present embodiment, in order to reduce a material cost of the stop plug 96, a thickness of the stop plug 96 except the large-diameter cylinder portion 98 is set small like 0.5 mm or less. In this case, a too small rigidity caused when a thickness of the large-diameter cylinder portion 98 is also reduced makes difficult an operation to attach/detach the stop plug 96 to/from the cover 74 by gripping this large-diameter cylinder portion 98. For this reason, in the case of the present embodiment, the rigidity of the large-diameter cylinder portion 98 is enhanced by increasing a thickness of the large-diameter cylinder portion 98 larger than a thickness of other portions.

Also, in the case of the present invention, the outer side surface of the rotary flange 13 provided to the outer peripheral surface of the hub 8a is finished into the predetermined shape and dimension by applying the turning process to this outer side surface in a predetermined state. In other words, when the turning process is applied to this outer side surface, first respective parts of respective constituent members of the wheel bearing unit 5 are processed into the predetermined shape and dimension in the parts maker that manufactures the wheel bearing unit 5, or the like. Then, respective constituent members of the wheel bearing unit 5 are assembled into a state shown in FIG. 1 in the parts maker that manufactures the wheel bearing unit 5. In other words, the outer ring 6, the hub 8a, the inner ring 16, and a plurality of balls 17, 17 are assembled together in a condition that a plurality of balls 17, 17 are provided between the outer ring raceways 11a, 11b provided on the inner peripheral surface of the outer ring 6 and the inner ring raceways 14a, 14b provided on the outer peripheral surfaces of the hub 8a and the inner ring 16 respectively. Then, the seal ring 19a is provided between the inner peripheral surface of the outer end portion of the outer ring 6 and the outer peripheral surface of the middle portion of the hub 8a, and also the encoder 72 is provided onto the outer peripheral surface of the inner end portion of the inner ring 16. Then, the cover 74 is fitted onto the outer peripheral surface of the inner end portion of the outer ring 6, and also the small-diameter cylinder portion 97 of the stop plug 96 is fitted/fixed into the insertion hole 84 provided in the cover 74 to close the insertion hole 84. In this case, an operation to provide the stop plug 96 in the insertion hole 84 may be executed before the cover 74 is fitted to the inner end portion of the outer ring 6. In any event, the space in which the encoder 72 is provided can be isolated from the outside in the state that the insertion hole 84 is closed by the stop plug 96.

Figure 4:
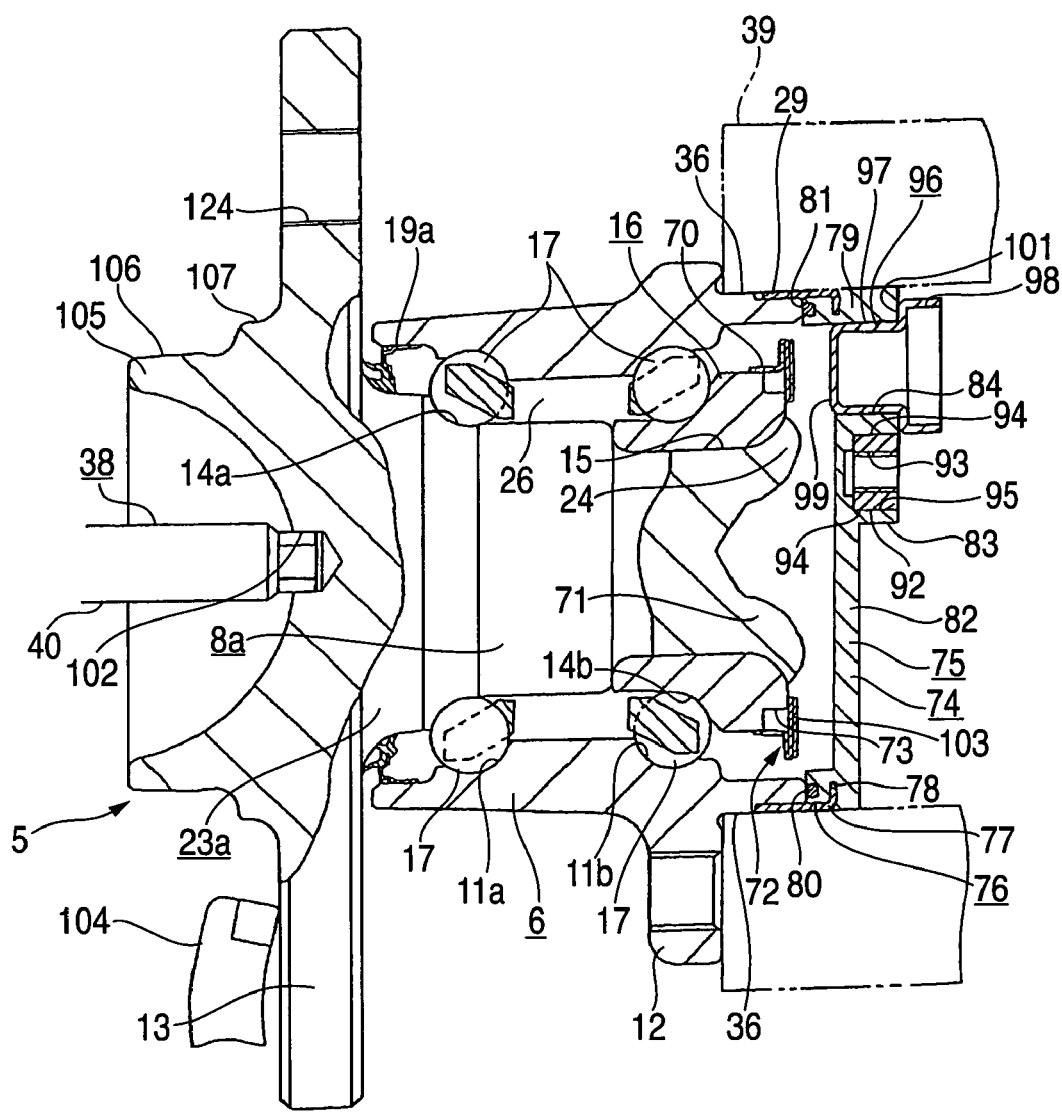
FIG. 4 is a sectional view showing the first embodiment in a state that a turning process is applied to an outer side surface of a rotary flange.

Then, as shown in FIG. 4, the wheel bearing unit 5 in which the turning process is applied to the outer side surface of the rotary flange 13 is fitted on the turning machine 38 in this condition. In this case, a large-diameter circular cylinder portion 36 provided on a portion of the outer peripheral surface of the outer ring 6 between the inner side surface of the stationary flange 12 and the small-diameter stepped portion 29 is clamped by top end portions of a chuck 39 constituting the turning machine 38. Then, the top end portions of the chuck 39 are put onto a flat surface portion, which coincides with a virtual flat surface that intersects orthogonally with the central axis of the outer ring 6, of the inner side surface of the stationary flange 12. Because the top end portions of the chuck 39 are put onto the inner side surface of the stationary flange 12 in this manner, the wheel bearing unit 5 can be fitted easily onto the turning machine 38 in a desired position.

Then, the top end portion, an outer peripheral surface of which is shaped into a hexagon, of the rotating shaft 40 of the turning machine 38 is fitted to the engaged concave portion 102 provided in the center portion of the outer end portion of the hub 8a. Then, the turning process is applied to the outer side surface of the rotary flange 13 by putting a precision machining tool 104 to this outer side surface in this condition while the hub 8a is rotated on its central axis by rotating/driving the rotating shaft 40, whereby this outer side surface can be finished into the predetermined shape and dimension in this case, the precision machining tool 104 applies the turning process to the outer side surface while moving on the flat surface that intersects orthogonally with the central axis of rotation of the hub 8a. Also, while rotating the hub 8a, another precision machining tool (not shown) is put onto a small-diameter cylinder portion 106, which is provided to the top half portion, and a large-diameter cylinder portion 107, which is provided to the bottom half portion, of the outer peripheral surface of a cylinder portion 105 that is provided to the outer end surface of the hub 8a to protrude in the axial direction respectively simultaneously with the turning process or before or after the turning process. This small-diameter cylinder portion 106 is fitted into a circular hole provided to the center portion of the wheel 1 when the wheel 1 (see FIG. 21) constituting the wheel is coupled to the hub 8a, while this large-diameter cylinder portion 107 is fitted into a circular hole provided to the center portion of the rotor 2 when the rotor 2 (see FIG. 21) is coupled to the hub 8a.

Then, the stop plug 96 is removed after the turning process is applied to the outer side surface of the rotary flange 13 but before the outer ring 6 is coupled/fixed to the knuckle 3. In contrast, the cover 74 is still fixed to the inner end portion of the outer ring 6 after the outer ring 6 is coupled/fixed to the knuckle 3. Then, after the outer ring 6 is coupled/fixed to the knuckle 3, the holder 85 is coupled/fixed to the cover 74 in a state that the inserted portion 86 of the holder 85 is inserted into the insertion hole 84 provided in the cover 74, whereby the wheel bearing unit with the rotation speed sensing unit is completed.

In the case of the method of manufacturing the wheel bearing unit of the present invention and the wheel bearing unit produced by this manufacturing method, the outer side surface of the rotary flange 13 provided to the outer peripheral surface of the hub 8a is finished into the predetermined shape and dimension by applying the turning process to this outer side surface while rotating the hub 8a with respect to the outer ring 6 in a state that respective constituent members of the wheel bearing unit 5 are assembled together. Therefore, in the case of the present invention, it can be eliminated that, when this outer side surface is to be processed into the predetermined shape and dimension, a dimensional error and a fitting error of respective constituent members of the wheel bearing unit 5 result in the worsening of a perpendicularity of the outer side surface of the rotary flange 13 to a center of rotation of the hub 8a. For this reason, the swing of the braking friction surface of the rotor 2 fixed to this outer side surface can be suppressed.

In addition, in the case of the present embodiment, when the turning process is applied to this outer side surface of the rotary flange 13, the cover 74 is fitted/fixed onto the inner end portion of the outer ring 6 and then the space in which the encoder 72 is sealed tightly and isolated from the outside by inserting/fixing the stop plug 96 into the insertion hole 84 provided to this cover 74. Therefore, when the outer side surface of the rotary flange 13 is processed into the predetermined shape and dimension, the event that the chips generated in this process adhere to the inner side surface of the encoder 72 through the insertion hole 84 can be prevented. As a result, a sensing performance of the rotation speed sensor that faces to the inner side surface of the encoder 72 can be assured sufficiently.

Further, according to the present invention, the stop plug 96 may be removed from the cover 74 fixed to the outer ring 6 immediately before the outer ring 6 is coupled/fixed to the knuckle 3. Therefore, while the wheel bearing unit 5 manufactured by the parts maker is carried to the finished car maker, or the like, adhesion of the foreign matter such as the magnetic powder, or the like to the inner surface of the encoder 72 can be prevented from this fitting of the stop plug 96 to the removal thereof. Also, the stop plug 96 may be removed from the cover 74 after the outer side surface of the rotary flange 13 is processed but before the outer ring 6 is coupled/fixed to the knuckle 3. Therefore, the stop plug 96 in no way disturbs the fitting of the holder 85, which holds the rotation speed sensor, onto the cover 74.

Also, in the case of the present embodiment, the large-diameter circular cylinder portion 36 provided to the outer peripheral surface near the inner end of the outer ring 6 is clamped by the chuck 39 constituting the turning machine 38. An improvement of a dimensional accuracy of the large-diameter circular cylinder portion 36 can be easily made. Therefore, an operation of putting the wheel bearing unit 5, to the outer side surface of the rotary flange 13 of which the turning process must be applied, on the turning machine 38 can be easily done.

Figure 5:
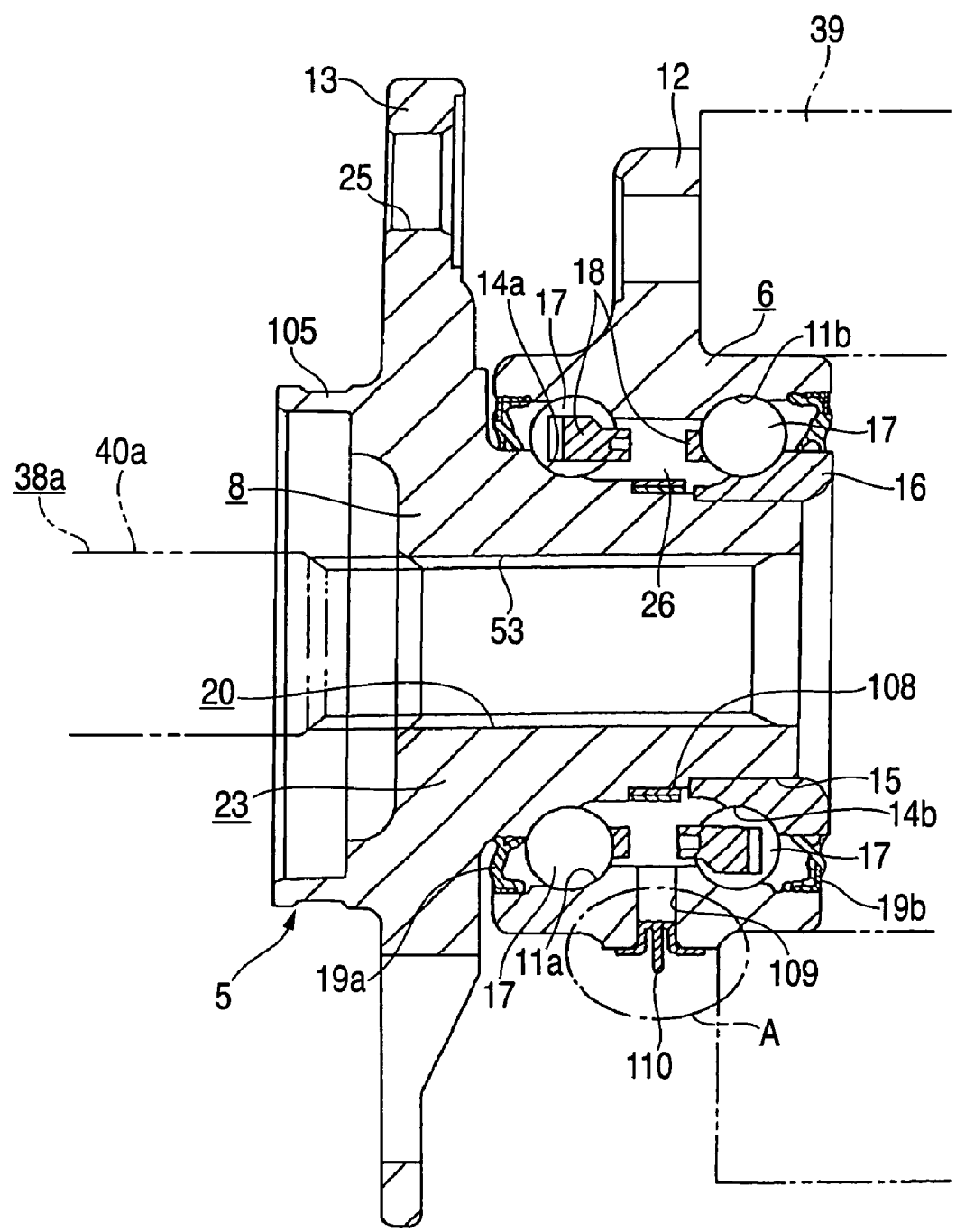
FIG. 5 is a sectional view showing a second embodiment of the present invention in a state that the turning process is applied to the outer side surface of the rotary flange.
Figure 6:
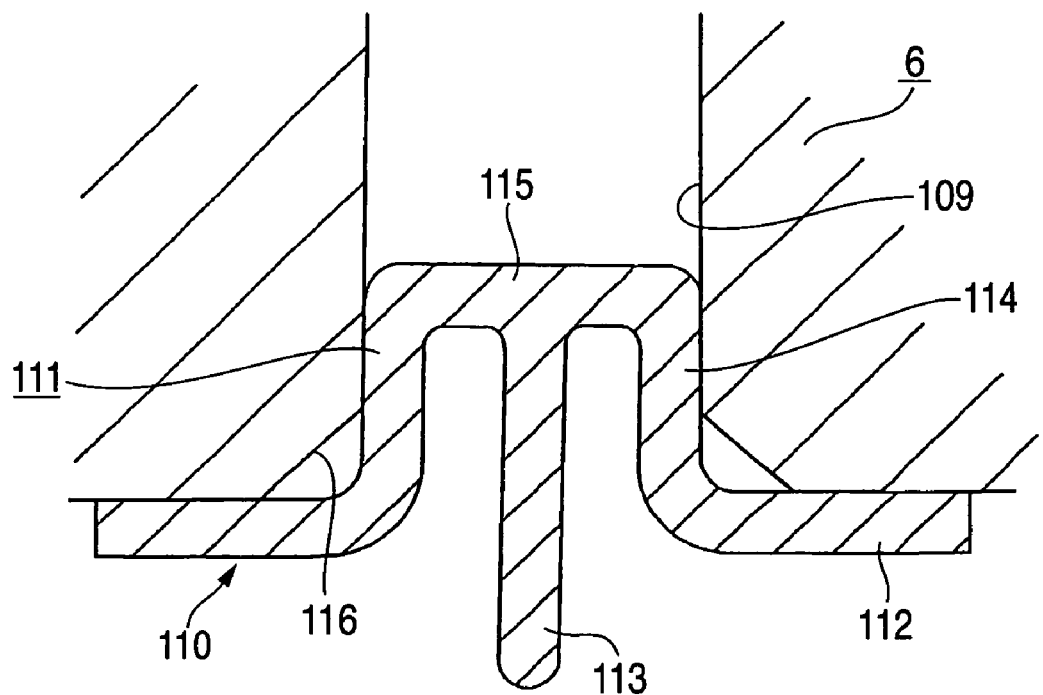
FIG. 6 is an enlarged sectional view of an A portion.
Figure 7:
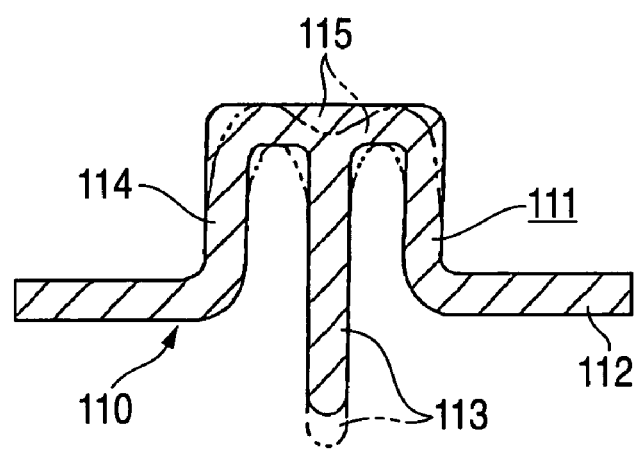
FIG. 7 is a sectional view showing a deformed state caused when the stop plug is removed in the second embodiment.

Next, FIGS. 5 to 7 show a second embodiment of the present invention, which also corresponds to claims 1, 3, 4, and 6. A wheel bearing unit of the present embodiment is used to bear the wheel that is used as the driven wheel, unlike the case of the above first embodiment. For this purpose, the spline hole 20 that passes through the hub 8 in the axial direction is formed at the center portion of the hub 8. Also, in the case of the present embodiment, the inner ring 16 is fitted/fixed onto the inner end portion of the hub 8 by means of the interference fit that generates a larger immobile force than an axial force generated based on the preload applied to respective balls 17, 17, or the like. Also, an encoder 108 is fitted/fixed onto a part of the outer peripheral surface of the middle portion of the hub 8, which is located between the inner ring raceway 14a formed on the outer peripheral surface of the hub 8 and the inner ring 16, by means of the interference fit. This encoder 108 is constructed by fitting/fixing an encoder main body formed like a circular cylinder onto an outer peripheral surface of a reinforcing member formed also like a circular cylinder. The reinforcing member is made of a magnetic metal plate such as a mild steel plate like SPCC, or the like and formed also like a circular cylinder. Also, the encoder main body is made of a rubber into which ferrite powders are mixed, for example, and is magnetized in the diameter direction. The magnetized direction is changed alternately at an equal interval in the circumferential direction. Thus, the S pole and the N pole are arranged on an outer peripheral surface of the encoder 108 alternately at an equal interval in the circumferential direction.

Then, an insertion hole 109 is formed in the middle portion of the outer ring 6 in the axial direction, which is located in a discontinuous portion of the stationary flange 12 in the circumferential direction, in a state that such insertion hole passes through the outer ring 6 from the outer peripheral surface to the inner peripheral surface in the radial direction. A rotation speed sensor (not shown) can be inserted into the inner side of this insertion hole 109. In operation of the wheel bearing unit, the rotation speed sensor is inserted into this insertion hole 109 and fixed thereto in such a manner that a sensing portion provided to a top end surface of the rotation speed sensor is positioned to oppose to the outer peripheral surface of the encoder 108 via a small clearance. Here, preferably the insertion hole 109 should be formed in the neighborhood of the horizontal area of the outer ring 6 is a fitted state of the wheel bearing unit to a suspension. The reason for this is that, if the insertion hole 109 is formed in the area to which the load is most hard to be applied, the influence of formation of the insertion hole 109 on a strength reduction of the outer ring 6 can be suppressed to the lowest minimum. Also, out of opening portions on both ends of the insertion hole 109, an opening portion formed on the inner peripheral surface side of the outer ring 6 is opposed to a sensed portion of the encoder 108, i.e., the outer peripheral surface of the encoder 108. Also, out of the opening portions on both ends of the insertion hole 109, a stop plug 110 is detachably attached to the opening portion formed on the outer peripheral surface side of the outer ring 6.

This stop plug 110 is integrally formed of the elastic material such as the elastomer like a synthetic rubber, a vinyl, etc., a synthetic resin, or the like, and has a fitting portion 111, a stopper portion 112, and a knob portion 113. The fitting portion 111 is formed like a bottomed circular cylinder consisting of a cylinder portion 114 and a bottom plate portion 115. Because an outer diameter of the cylinder portion 114 in its free condition is formed slightly larger than an inner diameter of the insertion hole 109, the fitting portion 111 can be fitted into the insertion hole 109 by means of the interference fit. Also, the bottom plate portion 115 stops one end of the cylinder portion 114 (an end portion on the inner diameter side of the outer ring 6 in a state that the stop plug is fitted into the outer ring 6 i.e., an upper end portion in FIGS. 5 to 7). Also, the stopper portion 112 is formed on the other end of the cylinder portion 114 (an end portion on the outer diameter side of the outer ring 6 in a state that the stop plug is fitted into the outer ring 6, i.e., a lower end portion in FIGS. 5 to 7) like an outward-directed flange. The stopper portion 112 is shaped to fit in with the outer peripheral surface of the outer ring 6. In this case, the stopper portion 112 has an outer diameter that is sufficiently larger than an outer diameter of a chamfered portion 116 (FIG. 6) that is formed on the opening end portion on the outer diameter side of the insertion hole 109. Also, the knob portion 113 is arranged on the inner side of the cylinder portion 114, and its base end portion (an upper end portion in FIGS. 5 to 7) is coupled to the bottom plate portion 115 and its top end portion (a lower end portion in FIGS. 5 to 7) is protruded from the opening on the other end of the cylinder portion 114 such that the knob portion can be pinched by the fingers or the tool such as the pliers, or the like.

In the case where the stopper portion 112 is curved along the outer peripheral surface of the outer ring 6, such stopper portion 112 can fulfill satisfactorily a role that stops the opening on the end portion of the insertion hole 109. Therefore, the outer peripheral shape of the fitting portion 111 is not always shaped into a cylindrical shape. For example, this outer peripheral shape may be shaped into a polygonal shape such as a triangle whose corners are rounded (triangular rice ball shape), a quadrangle, a hexagon, or the like. Conversely, if the fitting portion 111 is shaped into a circular cylinder and then the insertion hole 109 is stopped by this fitting portion 111, the presence of a clearance between the stopper portion 112 and the outer peripheral surface of the outer ring 6 may be allowed in a situation that the stopper portion 112 is shaped into a flat plate and then the stop plug 110 is fitted into the opening portion on the end portion of the insertion hole 109. Such clearance can give a clue to the tool such as a standard screwdriver, or the like used when the stop plug 110 is taken out from the insertion hole 109. Therefore, in case the stopper portion 112 is shaped to give the above clearance, the knob portion 113 can be omitted. Also, there is no necessity for providing the interference to the full length of the outer peripheral surface of the fitting portion 111 in the axial direction, and a shape that provides the interference only to a part of the full length in the axial direction may be employed. Also, a flat portion may be formed on the outer peripheral surface of the outer ring 6 in the peripheral area of the opening portion of the insertion hole 109. In the case where the flat portion is formed like the above, the side surface of the fitting flange can be brought into tight contact with the flat portion even though such side surface of the fitting flange provided to the base end portion of the rotation speed sensor is formed as a simple flat surface. Also, in the case where the flat portion is formed like the above, the stopper portion 112 can also be brought into tight contact with the flat portion if such stopper portion 112 provided to the stopper portion 112 is formed like a flat plate, so that the end portion of the opening portion of the insertion hole 109 can be closed by the stopper portion 112.

Also, in the case of the present embodiment, the turning process is applied to the outer side surface of the rotary flange 13 provided to the outer peripheral surface of the hub 8 in a predetermined position, and thus such outer side surface is finished into predetermined shape and dimension.

In other words, in the case where the turning process is applied to the outer side surface, first respective constituent members of the wheel bearing unit are assembled into a state shown in FIG. 5. That is, the outer ring 6, the hub 8, the inner ring 16, and a plurality of balls 17, 17 are assembled under the condition that a plurality of balls 17, 17 are provided between the outer ring raceways 11a, 11b provided on the inner peripheral surface of the outer ring 6 and the inner ring raceways 14a, 14b provided to the outer peripheral surfaces of the hub 8 and the inner ring 16 respectively. Also, a pair of seal rings 19a, 19b are provided between the inner peripheral surface of the outer ring 6 on both end sides and the outer peripheral surfaces of the hub 8 and the inner ring 16 respectively, and the encoder 108 is provided to the outer peripheral surface of the hub 8. Further, the stop plug 110 is fitted/fixed into the insertion hole 109 provided in the outer ring 6. In this condition, the internal space in which the encoder 108 is provided is isolated from the outside and is sealed tightly.

In this situation, the wheel bearing unit 5 the outer side surface of the rotary flange 13 of which is subjected to the turning process is fitted to a turning machine 38a. In this case, a portion of the outer peripheral surface of the outer ring 6, which is deviated toward the inner end side rather than the inner side surface of the stationary flange 12, is clamped by the top end portions of the chuck 39 constituting the turning machine 38a. Then, a top end portion of a rotating shaft 40a of the turning machine 38a is inserted into the spline hole 20 provided at the center portion of the hub 8, and thus a portion of the top end portion, on an outer peripheral surface of which a male spline portion is formed, is engaged with a female spline portion 53 formed on the inner peripheral surface of the spline hole 20. Then, the rotating shaft 40a is rotated/driven under the above condition to turn the hub 8 on its central axis, and then the turning process is applied to the outer side surface of the rotary flange 13 by putting a precision machining tool (not shown) to such outer side surface, and thus the outer side surface of the rotary flange is finished into predetermined shape and dimension. Thus, the wheel bearing unit 5 is completed. Then, the stop plug 110 is removed from the insertion hole 109 provided in the outer ring 6 after the turning process is applied to the outer side surface of the rotary flange 13 but before the outer ring 6 is coupled/fixed to the knuckle 3 (see FIG. 21). This removing operation is executed by pinching the top end portion of the knob portion 113 by the fingers or the tool, or the like and then pulling out the knob portion 113 outward (downward in FIGS. 1 to 3) in the diameter direction of the outer ring 6. When the knob portion 113 is pulled out in this manner, the bottom plate portion 115 and the cylinder portion 114 are elastically deformed as indicated by a chain line in FIG. 7, and thus a contact pressure between the outer peripheral surface of the cylinder portion 114 and the inner peripheral surface of the insertion hole 109 is reduced. As a result, the stop plug 110 can be pulled out from the insertion hole 109 by a relatively small force.

In the case of the present embodiment constructed as above, since the stop plug 110 is inserted/fixed into the insertion hole 109 provided in the outer ring 6 while the turning process is applied to the outer side surface of the rotary flange 13, the internal space 26 in which the encoder 108 is provided is isolated from the outside and is tightly sealed. Therefore, when the outer side surface of the rotary flange 13 is processed into the predetermined shape and dimension, the adhesion of the chips generated in this process on the outer peripheral surface of the encoder 108 through the insertion hole 109 can be prevented. As a result, a sensing performance of the rotation speed sensor that is positioned to oppose to the outer peripheral surface of the encoder 108 can be satisfactorily assured.

Since other structures and operations are similar to those in the above conventional configuration shown in FIG. 21 and in the foregoing first embodiment, their redundant explanation will be omitted herein by affixing the same reference numerals to like portions respectively. In the case of the present embodiment, unlike the above first embodiment, a fitting hole 25 through which the base end portion of the stud 9 (see FIG. 21) is press-fitted/fixed is formed at plural locations of the rotary flange 13 in the circumferential direction. An inner peripheral surface of these fitting holes 25 is formed as a plain cylindrical surface on which the internal thread portion is not provided. In the case of such present embodiment, the turning process is applied to the outer side surface of the rotary flange 13 after the base end portions of the studs 9 are press-fitted/fixed into these fitting holes 25. Also, an annular groove (not shown) having a center of rotation of the rotary flange 13 as its center is formed in a portion of the outer side surface of the rotary flange 13, which contains the opening ends of the fitting holes 25, before the turning process is applied to the outer side surface. The turning process cannot be applied to peripheral portions of these studs 9 and portions located between the neighboring studs 9 in the circumferential direction, nevertheless such an event can be prevented owing to the presence of the above annular groove that, when the turning process is applied to the outer side surface of the rotary flange 13, above portions out of the outer side surface are protruded in the axial direction from the remaining portion that has been subjected to the turning process.

Figure 8:
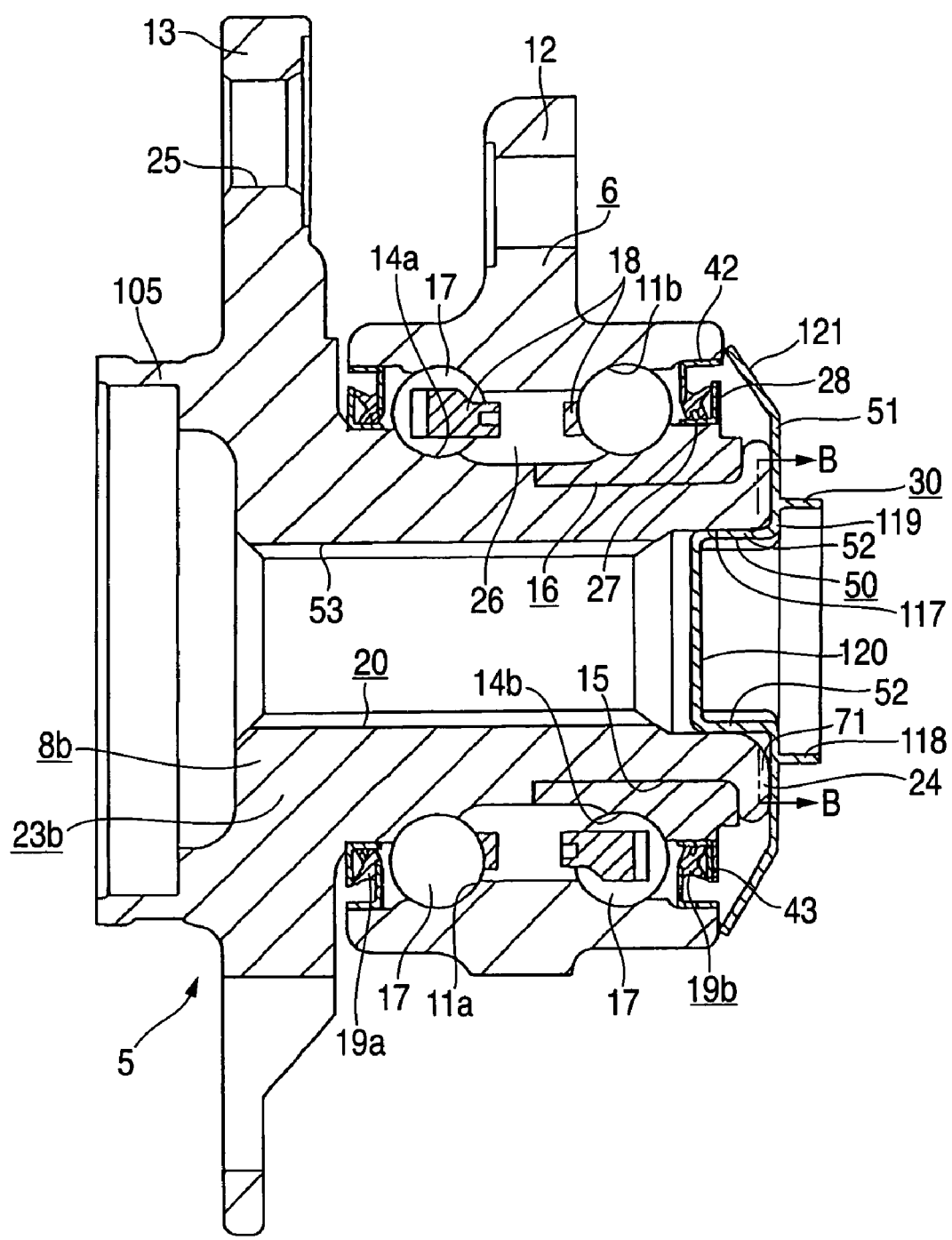
FIG. 8 is a sectional view showing a third embodiment of the present invention in a state that a cover is fixed to an inner end portion of a spline hole provided in a hub.
Figure 9:
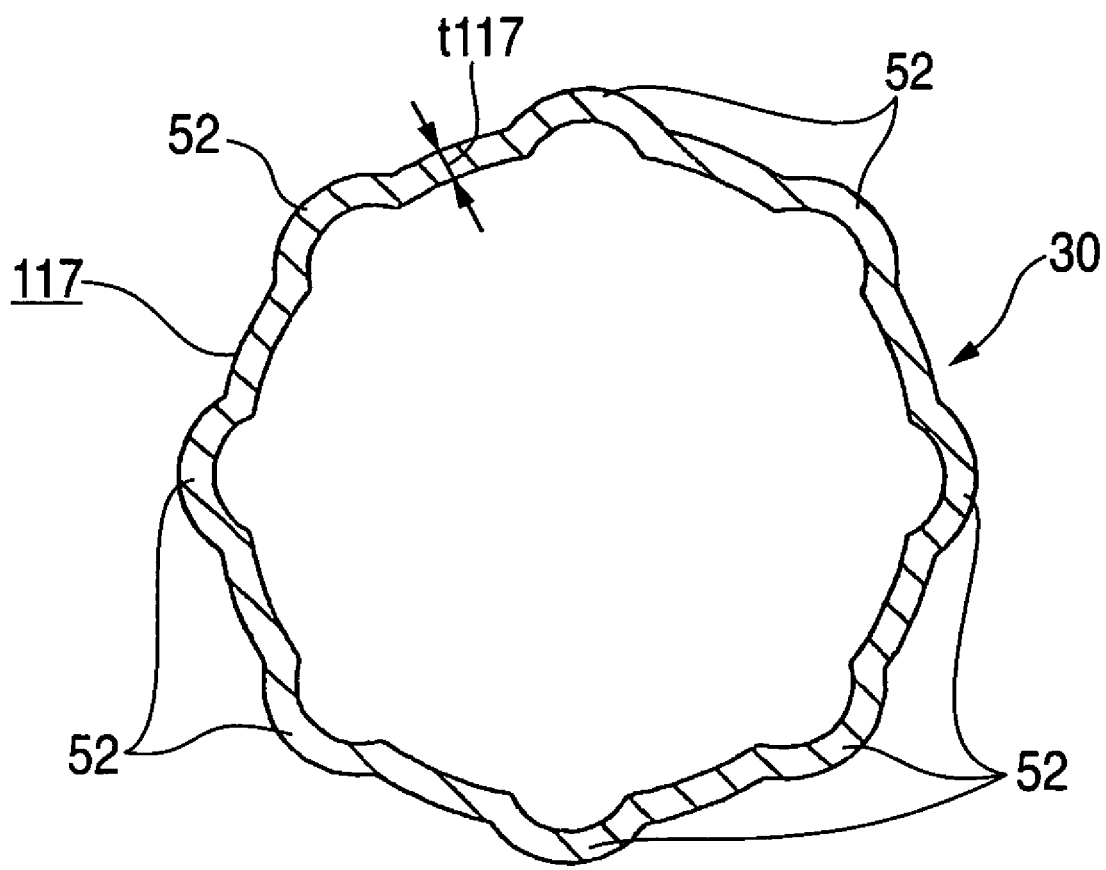
FIG. 9 is a schematic sectional view taken along a B-B line.

Next, FIGS. 8 and 9 show a third embodiment of the present invention, which also corresponds to claims 1, 3, 4, and 6. In the case of the present embodiment, unlike the case of the second embodiment shown in above FIGS. 5 to 7, the inner end surface of the inner ring 16 that is fitted onto the inner end portion of a hub 8b is held by the caulked portion 24 that is formed by plastically deforming the cylinder portion 71, which is provided to the inner end portion of the hub 8b, outward in the diameter direction by means of the caulking. Also, in the case of the present embodiment, unlike the case of the second embodiment shown in above FIGS. 5 to 7, the encoder is not fitted onto the outer peripheral surface of the hub 8b. Also, the insertion hole, which passes through in the diameter direction and through which the rotation speed sensor can be inserted, is not formed in the middle portion of the outer ring 6 in the axial direction. Alternately, in the case of the present embodiment, an encoder 28 is fixed to a part of the seal ring 19b that is provided between the inner peripheral surface of the inner end portion of the outer ring 6 and the outer peripheral surface of the inner end portion of the inner ring 16. In other words, this seal ring 19b consists of a slinger 27 that is formed as an annular ring as a whole to have an L-shaped cross section and fitted/fixed onto the inner end portion of the inner ring 16, a reinforcing member 42 that is formed as an annular ring as a whole to have an L-shaped cross section and fitted/fixed into the inner end portion of the outer ring 6, and an elastic member 43 a base end portion of which is coupled/fixed to the reinforcing member 42. Also, a top end edge of the seal lip constituting the elastic member 43 is brought into contact with the outer peripheral surface and the outer side surface of the slinger 27 to slide thereon.

Also, the encoder 28 is fixed to the inner surface of the slinger 27. This encoder 28 is made of a rubber magnet on which the S pole and the N pole are arranged alternately in the circumferential direction. More particularly, the encoder 28 is the circular-ring rubber magnet that is formed by mixing the ferrite powders into the rubber, and is magnetized in the axial direction. The magnetized direction is changed alternately at an equal interval in the circumferential direction. Therefore, the S pole and the N pole are arranged alternately at an equal interval on the inner surface of the encoder 28 in the circumferential direction. In operation of the wheel bearing unit 5, the sensing portion of the rotation speed sensor (not shown) secured to the outer ring 6, the knuckle 3 (see FIG. 21), or the like is opposed to the inner surface as the sensed portion of the encoder 28 via a small clearance. Then, an output signal of the rotation speed sensor, which is changed in response to the rotation speed of the encoder 28, can be picked up. The encoder 28 and the rotation speed sensor constitutes the rotation speed sensing device that can sense the rotation speed of the wheel fixed to the hub 8b.

Also, in the case of the present embodiment, the outer side surface of the rotary flange 13 provided to the outer peripheral surface of the hub 8b is finished into the predetermined shape and dimension by applying the turning process in a predetermined position. More specifically, in the case where the turning process is applied to the outer side surface, respective constituent members of the wheel bearing unit 5 are assembled into a state shown in FIG. 8 and also a cover 30 is fitted/fixed into the portion that is located near the inner end of the inner peripheral surface of the spline hole 20, which is provided at the center portion of the hub 8b, and gets out of the area in which the female spline portion 53 is formed. This cover 30 is made of a synthetic resin such as polyethylene terephthalate (PET), or the like by using the injection molding, or the like. The cover 30 has a fitted cylinder portion 50 formed like a bottomed circular cylinder, and a pressing collar portion 51 provided to the middle portion of the outer peripheral surface of the fitted cylinder portion 50 and formed like an outward-directed flange. In the fitted cylinder portion 50, a small-diameter cylinder portion 117 and a large-diameter cylinder portion 118 are concentrically coupled via a stepped portion 119 and also the outer end portion of the small-diameter cylinder portion 117 is stopped by a bottom plate portion 120. Also, plural locations (eight locations in the illustrated case) of the small-diameter cylinder portion 117 in the circumferential direction are expanded toward the outer diameter side over an almost full length along the axial direction, and thus projected portions 52, 52 projected on the outer diameter side are provided to that portions. In the case of the present embodiment, a thickness $t_{117}$ of the small-diameter cylinder portion 117 including the projected portions 52, 52 is set to the same dimension as a whole. Also, a diameter of a circumscribed circle of these projected portions 52, 52 in their free state is set slightly larger than an inner diameter of a portion of the inner end portion of the spline hole 20, which is deviated from the area in which the female spline portion 53 is formed. In addition, a portion of the pressing collar portion 51 positioned near the outer diameter is formed as a taper portion 121 whose diameter is increased gradually toward its top end edge.

In applying the turning process to the outer side surface of the rotary flange 13, first respective constituent members of the wheel bearing unit 5 are assembled and also the fitted cylinder portion 50 of the cover 30 is fitted/fixed into the inner end portion of the spline hole 20 provided in the hub 8b via plural projected portions 52, 52 by means of a small interference fit. Thus, the space in which the encoder 28 is provided is isolated from the outside and is sealed tightly.

Also, the outer side surface of the portion of the pressing collar portion 51 located near the inner diameter is pressed against the inner side surface of the caulked portion 24 provided to the inner end portion of the hub 8b, and also the top end edge of the taper portion 121 positioned near the outer diameter of the pressing collar portion 51 is pressed against the inner end surface of the outer ring 6. Under this condition, the wheel bearing unit 5 to the outer side surface of the rotary flange 13 of which the turning process is applied is fitted to the turning machine 38a (see FIG. 5). Also, the top end portion of the rotating shaft 40a (see FIG. 5) of the turning machine 38a is inserted into the inside of the spline hole 20 from the outside in the axial direction, and then is spline-engaged with the female spline portion 53 of the spline hole 20. In this situation, the turning process is applied to the outer side surface of the rotary flange 13 while rotating/driving the rotating shaft 40a. The cover 30 is removed from the inner end portion of the hub 8b after this turning process but before the outer ring 6 is coupled/fixed to the knuckle 3 (see FIG. 21).

As described above, in the case of the present embodiment, a space between the inner peripheral surface of the inner end portion of the outer ring 6 and the outer peripheral surface of the inner end portion of the hub 8b are isolated mutually and sealed tightly with the cover 30 while the turning process is applied to the outer side surface of the rotary flange 13. Therefore, it can be prevented that the chips generated in applying the turning process to the outer side surface of the rotary flange 13 adhere to the outer side surface of the encoder 28. Also, because the operator can grasp the large-diameter cylinder portion 118 that is projected from the inner end surface of the hub 8b in the base half portion (the right half portion in FIG. 8) of the fitted cylinder portion 50 constituting the cover 30, an operation of removing the cover 30 from the hub 8b is easily done by such operator before the wheel bearing unit 5 is fitted to the suspension system.

Also, in the case of the present embodiment, the fitted cylinder portion 50 of the cover 30 is fitted/fixed into the inner end portion of the spline hole 20 via a plurality of projected portions 52, 52 during the turning process applied to the outer side surface of the rotary flange 13. For this reason, a dimensional tolerance of the inner diameter of the inner end portion of the spline hole 20 can be set large like about 0.2 mm, and also the fitted cylinder portion 50 can be detachably attached easily to the spline hole 20 by a small force even when the inner diameter of the inner end portion of the spline hole 20 is processed smaller than a normal dimension.

Since other structures and operations are similar to those in the second embodiment shown in above FIGS. 5 to 7, their redundant explanation will be omitted herein by affixing the same reference numerals to like portions respectively.

Figure 10:
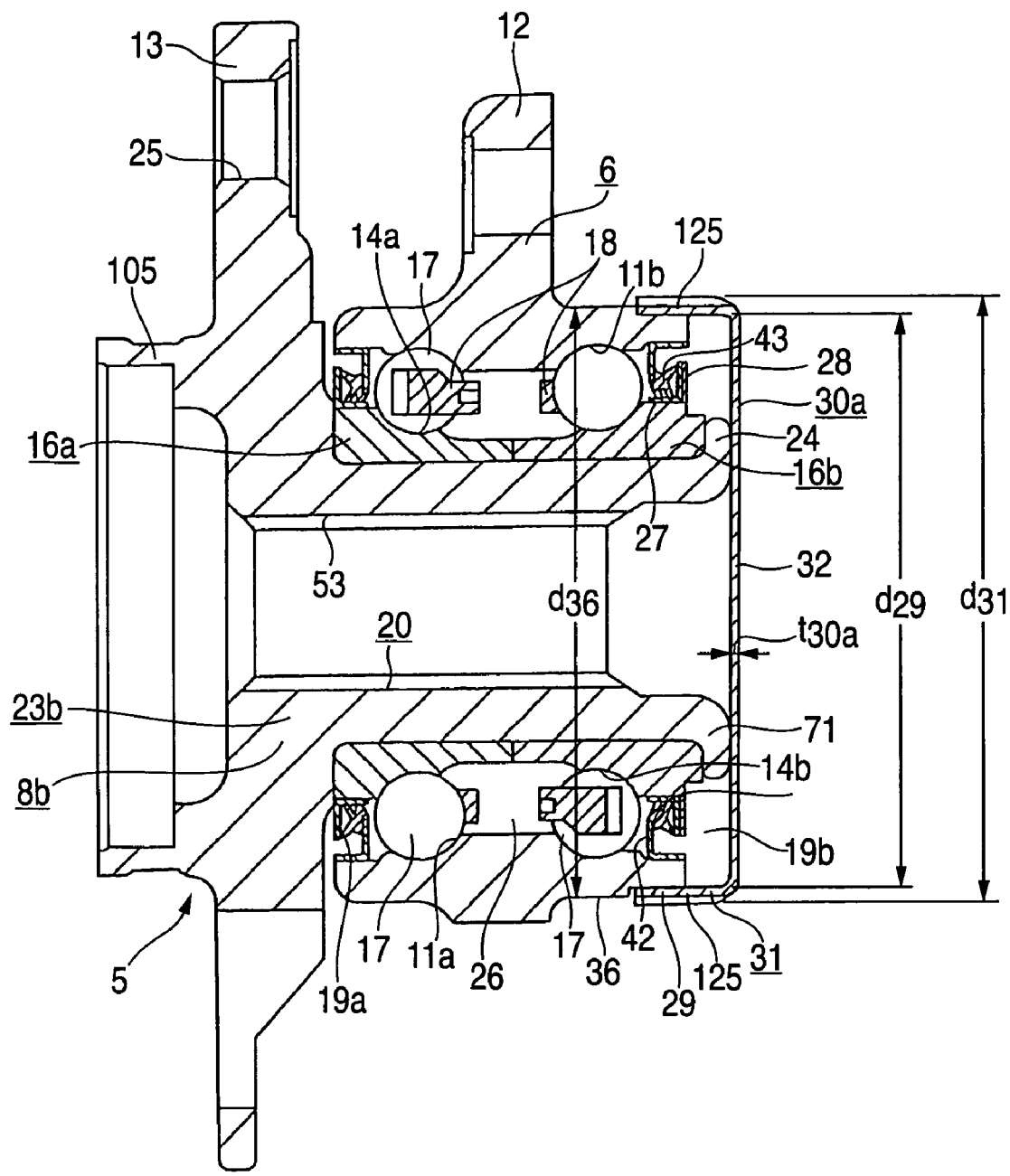
FIG. 10 is a sectional view showing a fourth embodiment of the present invention in a state that the cover is fixed to an inner end portion of an outer ring.

Next, FIG. 10 shows a fourth embodiment of the present invention, which also corresponds to claims 1, 3, 4, and 6. In the case of the present embodiment, unlike the third embodiment shown in above FIGS. 8 and 9, a pair of inner rings 16a, 16b are fitted/fixed onto the middle portion and the inner end portion of the outer peripheral surface of the hub 8b in the axial direction respectively. Also, the inner ring raceways 14a, 14b are formed on outer peripheral surfaces of these inner rings 16a, 16b respectively. Also, a pair of seal rings 19a, 19b for sealing tightly the internal space 26 in which a plurality of balls 17, 17 are provided are provided between the outer peripheral surfaces of the end portions of the inner rings 16a, 16b and the inner peripheral surfaces of both end portions of the outer ring 6.

Also, the turning process is applied to the outer side surface of the rotary flange 13 provided to the outer peripheral surface of the hub 8b in a predetermined position, and thus such outer side surface is finished to the predetermined shape and dimension. When the turning process is applied to the outer side surface, respective constituent members of the wheel bearing unit 5 are assembled in the state shown in FIG. 10 in the parts maker that manufactures the wheel bearing unit 5. A cover 30a formed like a bottomed circular cylinder is fitted/fixed onto the outer peripheral surface of the small-diameter stepped portion 29 of the outer ring 6 formed on the inner half portion that is deviated inward rather than the inner side surface of the stationary flange 12 in the axial direction. This cover 30a is made of a synthetic resin such as polyethylene terephthalate (PET), or the like by using the injection molding, or the like. The cover 30a has a cylinder portion 31, and a bottom plate portion 32 that closes the inner end of the cylinder portion 31. Also, plural locations (e.g., ten locations) of the cylinder portion 31 in the circumferential direction are expanded toward the inner diameter side over an almost full length along the axial direction, and thus projected portions 125, 125 projected on the inner diameter side are provided at plural locations of the inner peripheral surface of the cylinder portion 31 in the circumferential direction. Also, a diameter of an inscribed circle of these projected portions 125, 125 in their free state is set slightly smaller than an outer diameter of the small-diameter stepped portion 29 provided to the inner end portion of the outer ring 6. Also, a thickness $t_{30a}$ of the cover 30a is set to the same dimension as a whole. Then, dimensions of respective portions are regulated such that the thickness $t_{30a}$ of the cover 30a, a diameter $d_{29}$ of the small-diameter stepped portion 29, and a diameter $d_{36}$ of the large-diameter circular cylinder portion 36 provided to the outer peripheral surface of the outer ring 6 between the inner side surface of the stationary flange 12 and the small-diameter stepped portion 29 can satisfy a relationship of $d_{36} > d_{29} + 2t_{30a}$.

In applying the turning process to the outer side surface of the rotary flange 13, first respective constituent members of the wheel bearing unit 5 are assembled into a state shown in FIG. 10 and also the cylinder portion 31 of the cover 30a is fitted/fixed onto the small-diameter stepped portion 29 provided to the inner end portion of the outer ring 6 via plural projected portions 125, 125 by means of a small interference fit. In this condition, the space in which the encoder 28 is provided is isolated from the outside and sealed tightly. Also, the outer side surface of the bottom plate portion 32 constituting the cover 30a is pushed against the end surface of the caulked portion 24 that is provided to the inner end portion of the hub 8b. Then, the wheel bearing unit 5 is fitted to the turning machine 38a (see FIG. 5) in this situation. In other words, the large-diameter circular cylinder portion 36 provided on the portion of the outer peripheral surface near the inner end of the outer ring 6 is grasped by the chuck 39 (see FIG. 5) of the turning machine 38a. In the case of the illustrated example, a diameter $d_{31}$ of a circumscribed circle of the cylinder portion 31 constituting the cover 30a is set larger than a diameter $d_{36}$ of the large-diameter circular cylinder portion 36 ($d_{31} > d_{36}$) in a state obtained before the large-diameter circular cylinder portion 36 is grasped by the chuck 39. In this case, since the thickness $t_{30a}$ of the cover 30a, the diameter $d_{36}$ of the large-diameter circular cylinder portion 36, and the diameter $d_{29}$ of the small-diameter stepped portion 29 satisfy the above relationship ($d_{36} > d_{29} +$ $2t_{30a}$), a diameter of portions, which are displaced from the projected portions 125, 125 in the circumferential direction, of the cylinder portion 31 of the cover 30a is elastically reduced by the top end portions of the chuck 39 when the large-diameter circular cylinder portion 36 is grasped by the above top end portions from the outer diameter side. Then, the outer peripheral surface of the cylinder portion 31 is never protruded toward the outer diameter side beyond the large-diameter circular cylinder portion 36. As a result, the cover 30a never offers an obstruction when the chuck 39 clamps the large-diameter circular cylinder portion 36.

Then, the top end portion of the rotating shaft 40a (see FIG. 5) of the turning machine 38a is inserted into the inside of the spline hole 20 from the outside in the axial direction, and then is spline-engaged with the female spline portion 53 of the spline hole 20. In this situation, the turning process is applied to the outer side surface of the rotary flange 13 while rotating/driving the rotating shaft 40a. The cover 30a is removed from the inner end portion of the outer ring 6 after this turning process but before the outer ring 6 is coupled/fixed to the knuckle 3 (see FIG. 21).

As described above, in the case of the present embodiment, such an event can also be prevented that the chips generated in applying the turning process to the outer side surface of the rotary flange 13 adhere to the outer side surface of the encoder 28.

Since other structures and operations are similar to those in the third embodiment shown in above FIGS. 8 and 9, their redundant explanation will be omitted herein by affixing the same reference numerals to like portions respectively.

Figure 11:
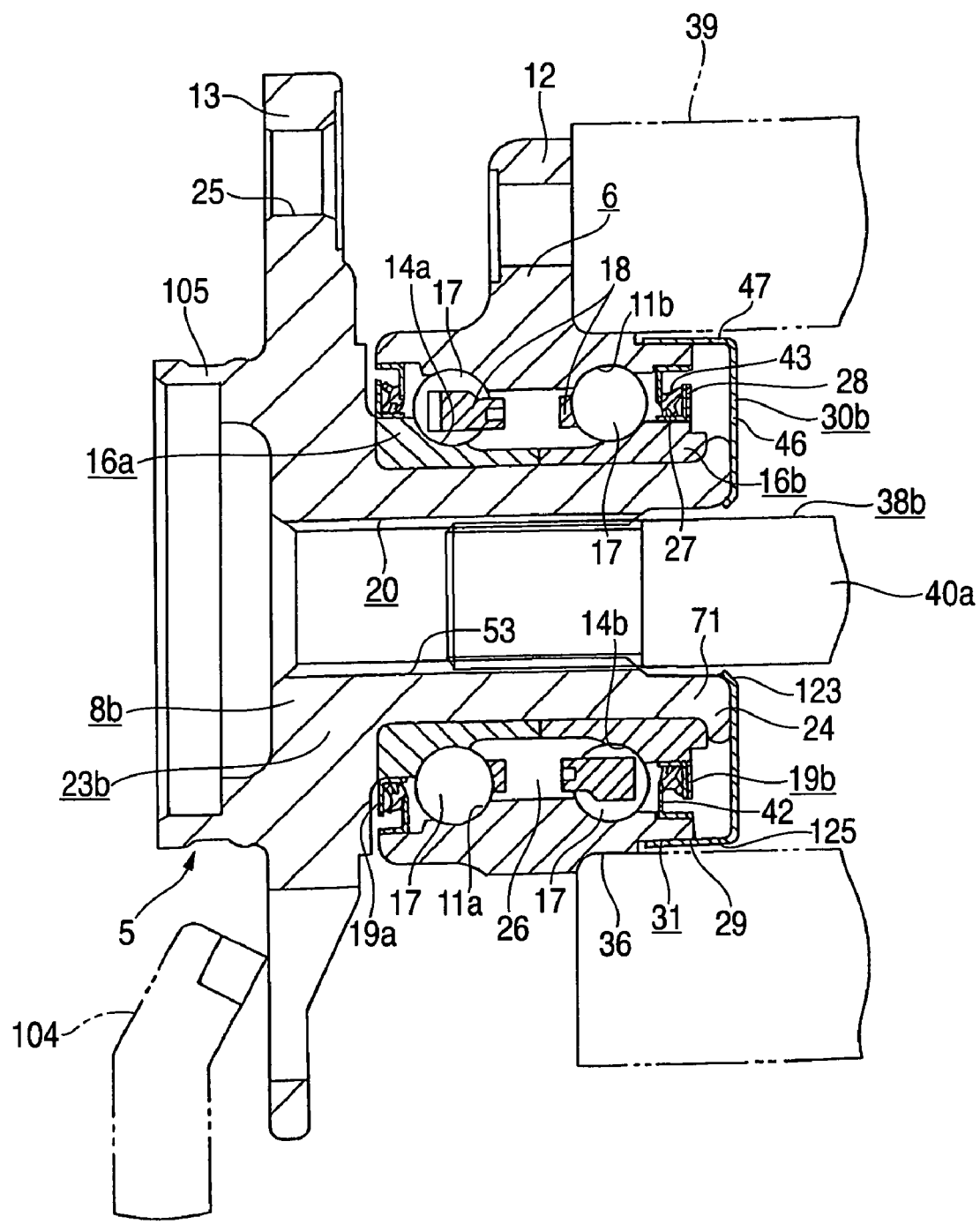
FIG. 11 is a sectional view showing a fifth embodiment of the present invention in a state that the turning process is applied to the outer side surface of the rotary flange.

Next, FIG. 11 shows a fifth embodiment of the present invention, which also corresponds to claims 1, 3, 4, and 6. In the case of the present embodiment, in applying the turning process to the outer side surface of the rotary flange 13 provided to the outer peripheral surface of the hub 8b, a cover 30b shaped into an annular ring is fitted/fixed onto the small-diameter stepped portion 29 provided to the outer peripheral surface of the inner end portion of the outer ring 6. In other words, the cover 30b is formed like the annular ring that has a circular ring portion 46, and a cylinder portion 47 extended from the outer peripheral edge of this circular ring portion 46 in the axial direction. Also, an inner peripheral edge of the circular ring portion 46 is formed as a taper portion 123 that is inclined over a full circumference to substantially fit in with a profile of the inner peripheral edge portion of the caulked portion 24 that is provided to the inner end portion of the hub 8b.

In applying the turning process to the outer side surface of the rotary flange 13, first respective constituent members of the wheel bearing unit 5 are assembled and also the cylinder portion 47 of the cover 30b is fitted/fixed onto the small-diameter stepped portion 29 provided to the outer peripheral surface of the inner end portion of the outer ring 6 by means of a small interference fit. Also, an outer side surface of the taper portion 123 provided to the inner peripheral edge portion of the cover 30b is thrust against the inner side surface of the caulked portion 24. In this condition, the space in which the encoder 28 is provided is isolated from the outside and is sealed tightly. In this situation, the wheel bearing unit 5 to the outer side surface of the rotary flange 13 of which the turning process is applied is fitted to a turning machine 38b. In this case, the large-diameter circular cylinder portion 36 provided on the portion of the outer peripheral surface near the inner end of the outer ring 6 is clamped by the chuck 39. Also, the top end portion of rotating shaft 40a of the turning machine 38b is inserted into the inside of the spline hole 20 provided to the hub 8b from the outside in the axial direction, and then is spline-engaged with the female spline portion 53 of the spline hole 20. Then, under this condition, the outer side surface of the rotary flange 13 is finished into the predetermined shape and dimension by putting the precision machining tool 104 to this outer side surface while rotating/driving the rotating shaft 40a.

In the case of the present embodiment, the chips generated in the turning process applied to the outer side surface of the rotary flange 13 can be prevented from adhering on the inner side surface of the encoder 28.

Since other structures and operations are similar to those in the fourth embodiment shown in above FIG. 10, their redundant explanation will be omitted herein by affixing the same reference numerals to like portions respectively. In the case of the present embodiment, the rotating shaft 40a of the turning machine 38b is arranged on the inner diameter side of the chuck 39.

Figure 12:
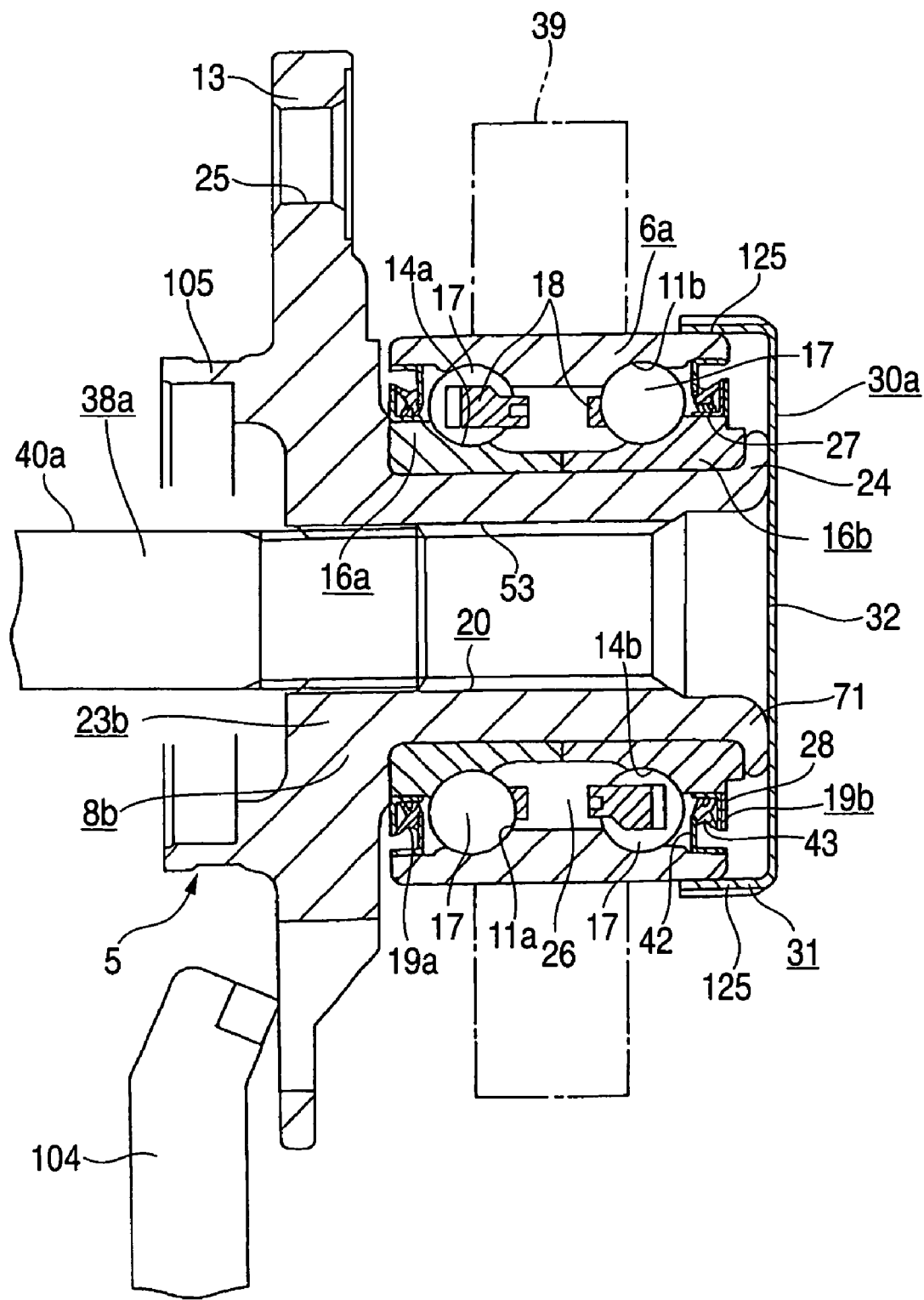
FIG. 12 is a sectional view showing a sixth embodiment of the present invention in a state that the turning process is applied to the outer side surface of the rotary flange.

Next, FIG. 12 shows a sixth embodiment of the present invention, which also corresponds to claims 1, 3, 4, and 6. In the case of the present embodiment, in the configuration in the fourth embodiment shown in above FIG. 10, the outer peripheral surface of an outer ring 6a is formed as a simple circular cylindrical surface to which the stationary flange is not provided. In this configuration of the present embodiment, when the turning process is applied to the outer side surface of the rotary flange 13 provided to the outer peripheral surface of the hub 8b, the middle portion of the outer peripheral surface of the outer ring 6a, which is deviated from the portion onto which the cover 30a is fitted/fixed, in the axial direction is grasped by the chuck 39 of the turning machine 38a. Also, the top end portion of the rotating shaft 40a of the turning machine 38a is inserted into the inside of the spline hole 20 provided to the hub 8b from the outside in the axial direction, and then is spline-engaged with the female spline portion 53 of the spline hole 20. Then, under this condition, the outer side surface of the rotary flange 13 is finished into the predetermined shape and dimension by putting the precision machining tool 104 to this outer side surface while rotating/ driving the rotating shaft 40a.

Since other structures and operations are similar to those in the fourth embodiment shown in above FIG. 10, their redundant explanation will be omitted herein by affixing the same reference numerals to like portions respectively.

Figure 13:
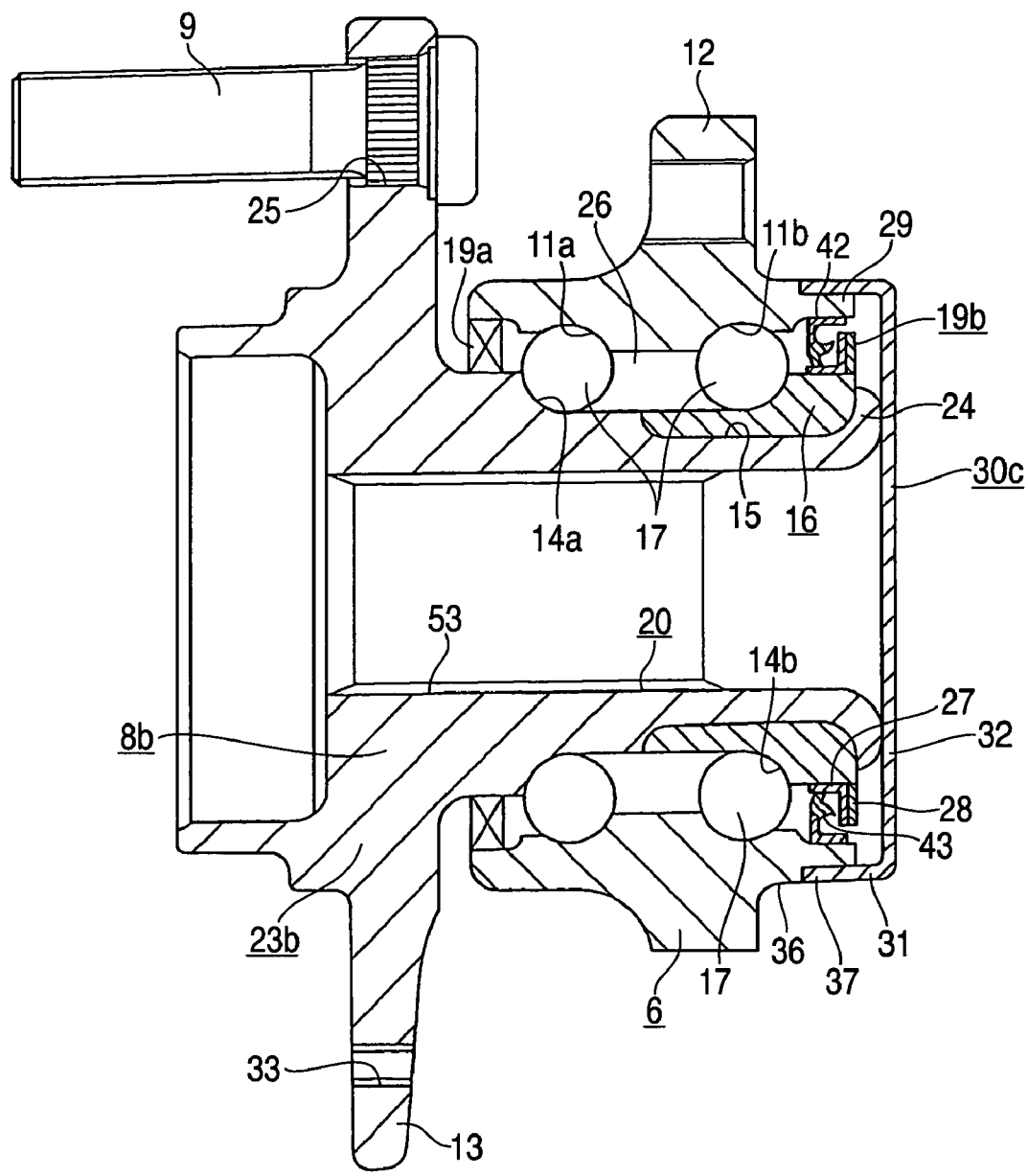
FIG. 13 is a sectional view showing a seventh embodiment of the present invention in a state that the cover is fixed to the inner end portion of the outer ring before a rotor is fixed to the rotary flange.
Figure 14:
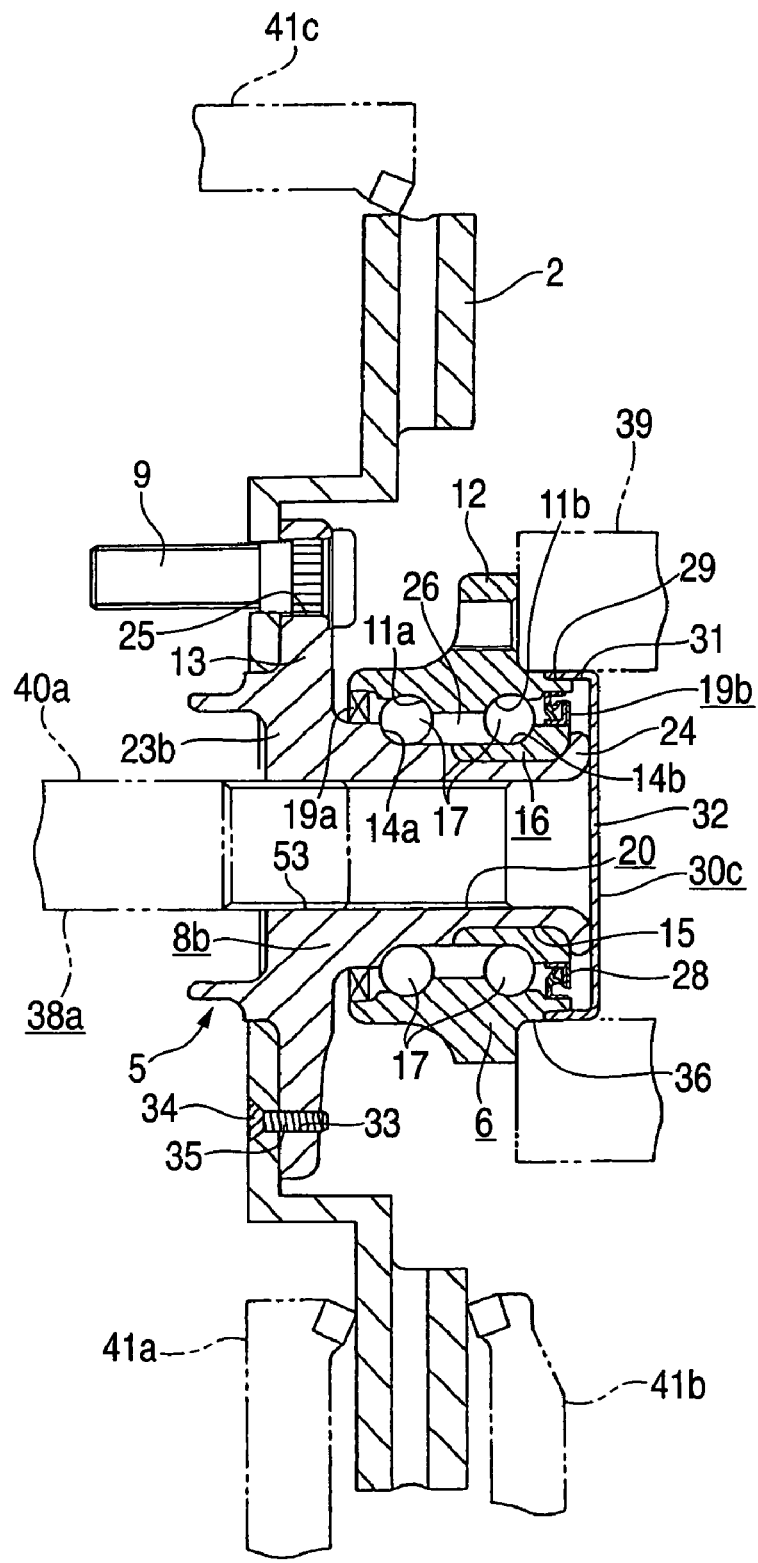
FIG. 14 is a sectional view showing the seventh embodiment similarly in a state that the turning process is applied to both side surfaces and an outer peripheral surface of the rotor.

Next, FIGS. 13 and 14 show a seventh embodiment of the present invention, which corresponds to claims 2, 3, 5, and 6. In a wheel bearing unit of the present embodiment, in the wheel bearing unit of the third embodiment shown in above FIGS. 8 and 9, the rotor 2 (FIG. 14) as the braking rotating body is coupled/fixed to the outer side surface of the rotary flange 13 provided to the outer peripheral surface of the hub 8b. Also, in the wheel bearing units of the above embodiments, the outer side surface of the rotary flange 13 is finished into the predetermined shape and dimension by applying the turning process to this outer side surface in the predetermined position. In contrast, in the case of the wheel bearing unit of the present embodiment, the turning process is not applied to the outer side surface of the rotary flange 13 in such state. Alternately, in the case of the present embodiment, the turning process is applied to both side surfaces, which are located near the outer diameter and serve as the braking friction surface respectively, of the rotor 2, which is coupled/fixed to the outer side surface of the rotary flange 13, in the predetermined condition. Also, in the case of the present embodiment, the small-diameter stepped portion 29 is formed on the inner half portion, which is shifted toward the inner end side from the inner side surface of the stationary flange 12, of the outer peripheral surface of the outer ring 6. Also, the base end portion of the stud 9 is press-fitted/fixed to the inside of the fitting holes 25, which are provided to plural locations in the circumferential direction of the rotary flange 13, respectively.

In order to couple/fix the rotor 2 to the outer side surface of the rotary flange 13, in the case of the present embodiment, a threaded hole 33 is formed in two positions in the circumferential direction of the rotary flange 13. Also, through holes 34 (FIG. 14) are formed in positions that are located near the inner diameter of the rotor 2 and located in alignment with the threaded holes 33 respectively. Then, as shown in FIG. 14, tentatively setting screws 35 are passed through the through holes 34 and then screwed tightly into the threaded holes 33 in a state that the inner side surface of the rotor 2 near the inner diameter is put on the outer side surface of the rotary flange 13. With this arrangement, the rotor 2 is coupled/fixed to the outer side surface of the rotary flange 13. The rotor 2 is shaped into the rough profile by the casting, or the like, and then the inner side surface that comes in touch with the rotary flange 13 is finished smoothly by applying a machining process to the inner side surface before the rotor 2 is coupled/fixed to the rotary flange 13. Therefore, the rotor 2 can be coupled/fixed to the outer side surface of the rotary flange 13 without play. Then, portions of both side surfaces of the rotor 2 near the outer diameter are finished into predetermined shape and dimension by applying the turning process to both side surfaces in a predetermined position.

More particularly, when the turning process is applied to the portions of both side surfaces of the rotor 2 near the outer diameter, first respective parts of respective constituent members of the wheel bearing unit 5 are processed into the predetermined shape and dimension in the parts maker that manufactures the wheel bearing unit 5. Then, respective constituent members of the wheel bearing unit 5 are assembled into a state shown in FIG. 13 in the parts maker that manufactures the wheel bearing unit 5 before the rotor 2 is coupled. In other words, the outer ring 6, the hub 8b, the inner ring 16, and a plurality of balls 17, 17 are assembled together in a condition that a plurality of balls 17, 17 are provided between the outer ring raceways 11a, 11b provided on the inner peripheral surface of the outer ring 6 and the inner ring raceways 14a, 14b provided on the outer peripheral surfaces of the hub 8b and the inner ring 16 respectively. Then, a pair of seal rings 19a, 19b are provided between the inner peripheral surface of the both end portions of the outer ring 6 and the outer peripheral surfaces of the hub 8a and the end portion of the inner ring 16. Then, the base end portions of a plurality of studs 9 are fixed to the rotary flange 13.

Then, a cover 30c is fitted/fixed onto the small-diameter stepped portion 29 provided to the outer peripheral surface of the inner end portion of the outer ring 6. This cover 30c is formed into a bottomed circular cylinder that has the cylinder portion 31 and the bottom plate portion 32 that stops the inner end of the cylinder portion 31, by injection-molding an inexpensive synthetic resin such as polypropylene (PP), polyethylene (PE), or the like. The cover 30c is fitted to the inner end portion of the outer ring 6 by fitting/fixing the cylinder portion 31 onto the small-diameter stepped portion 29 by means of the clearance fit or the small interference fit. Also, the top end portion of the cylinder portion 31 of the cover 30c is pushed to abut against the large-diameter circular cylinder portion 36, which is provided on a portion of the outer peripheral surface of the outer ring 6 between the inner side surface of the stationary flange 12 and the small-diameter stepped portion 29, and a stepped surface 37 formed as a discontinuous portion between the small-diameter stepped portion 29 and the large-diameter circular cylinder portion 36 on the outer peripheral surface of the inner end portion of the outer ring 6. With this arrangement, the space in which the encoder 28 is provided is isolated from the outside of the cover 30c and sealed tightly. This cover 30c can be detachably attached easily to the small-diameter stepped portion 29 by a small force (of 20 N or less). In the case where the cover 30c can be detachably attached easily to the small-diameter stepped portion 29 in this manner, the cover 30c is liable to come off from the inner end portion of the outer ring 6 when the wheel bearing unit 5 to which the cover 30c is fitted is carried while directing this cover 30c downward. In order to prevent such disengagement, this cover 30c is positioned upward while the wheel bearing unit 5 to which the cover 30c is fitted is carried. In the case of the present embodiment, dimensions of respective portions are regulated such that an outer diameter of the cover 30c is set slightly smaller than an outer diameter of the large-diameter circular cylinder portion 36 in a condition that the cover 30c is fitted/fixed onto the small-diameter stepped portion 29.

Such wheel bearing unit 5 prior to a state that the rotor 2 is coupled thereto is carried from the parts maker to the assembling maker that manufactures a finished product of the wheel bearing unit 5. Then, in the assembling maker, the portion near the inner diameter of the rotor 2 that is carried from another parts maker is coupled/fixed to the outer side surface of the rotary flange 13 provided to the hub 8b by the tentatively setting screws 35. Then, as shown in FIG. 14, the wheel bearing unit 5 to both side surfaces of the rotor 2 of which the turning process is applied is fitted to the turning machine 38a in this condition. In this event, the large-diameter circular cylinder portion 36 provided to the portion of the outer ring 6 near the inner end is clamped by the top end portions of the chuck 39 constituting the turning machine 38a. Also, the top end portions of the chuck 39 are thrust against the inner side surface of the stationary flange 12.

Then, the top end portion of the rotating shaft 40a of the turning machine 38a is inserted into the inside of the spline hole 20 provided at the center portion of the hub 8b from the outside in the axial direction, and then is spline-engaged with the female spline portion 53 provided to the inner peripheral surface of the spline hole 20. In this situation, the turning process is applied to both side surfaces of the rotor 2 near the outer diameter by putting two precision machining tools 41a, 41b to these portions while rotating/driving the hub 8b on its central axis by rotating/driving the rotating shaft 40a. Thus, both side surfaces of the rotor 2 are finished into the predetermined shape and dimension. In this case, the precision machining tools 41a, 41b apply the turning process to both side surfaces while moving on a plane that intersects orthogonally with a center-of-rotation axis of the hub 8b respectively. At the same time, the outer peripheral surface of the rotor 2 is finished into the predetermined shape and dimension by putting another precision machining tool 41c to such outer peripheral surface, whereby the wheel bearing unit 5 is finished to a finished product. The cover 30c is removed from the inner end portion of the outer ring 6 after the turning process is applied to both side surfaces of the rotor 2 but before the outer ring 6 is coupled/fixed to the knuckle 3 (see FIG. 21). In this fashion, unlike the cover 74 used in the first embodiment shown in above FIGS. 1 to 4, for example, the cover as the constituent element of the present invention is different from the cover that is fitted to the inner end portion of the outer ring 6 or a rotating member 23b as it is in a condition that the wheel bearing unit is fitted to the suspension system, and does not support the rotation speed sensor.

As described above, in a method of manufacturing the wheel bearing unit and the wheel bearing unit obtained by this manufacturing method according to the present embodiment, both side surfaces of the rotor 2 near the outer diameter are finished into the predetermined shape and dimension by applying the turning process to both side surfaces of the rotor 2 while rotating the rotating member 23b to which the rotor 2 is coupled/fixed around the outer ring 6 in a state that respective constituent members of the wheel bearing unit 5 are assembled. For this reason, in the case of the present invention, when both side surfaces of the rotor 2 near the outer diameter, which serve as the braking friction surface respectively, are finished into the predetermined shape and dimension, such an event can be eliminated that a dimensional error or an assembling error that is inevitable in manufacturing a plurality of parts existing between the knuckle 3 and the rotor 2 leads to the worsening of a perpendicularity of both side surfaces to a center of rotation of the rotating member 23b. Therefore, the swing of both side surfaces can be suppressed smaller than that in above embodiments and sufficiently. Also, since there is no necessity to improve particularly a dimensional accuracy of a plurality of parts existing between the knuckle 3 and the rotor 2, a cost required to suppress the swing of both side surfaces can be suppressed sufficiently.

Further, in the case of the present embodiment, while the turning process is applied to both side surfaces of the rotor 2, the space in which the encoder 28 is provided is isolated from the outside of the cover 30c by fitting/fixing the cover 30c onto the inner end portion of the outer ring 6. Therefore, when both side surfaces of the rotor 2 are to be processed into the predetermined shape and dimension, the adhesion of the chips generated in this processing onto the inner side surface of the encoder 28 can be prevented. As a result, a sensing performance of the rotation speed sensor that is opposed to the inner side surface of the encoder 28 can be assured sufficiently. Also, in the case of the present embodiment, the particular consideration to prevent the adhesion of the chips onto the inner side surface of the encoder 28 is not required of the assembling maker that applies the turning process to both side surface of the rotor 2. In addition, in the case of the present embodiment, the bottomed circular cylinder-like cover 30c having the bottom plate portion 32 in which the through hole to pass through both side surfaces is not provided is fitted/fixed onto the inner end portion of the outer ring 6, and also the turning process is applied to both side surfaces of the rotor 2 in a condition that the top end portion of the rotating shaft 40a of the turning machine 38a is inserted into the inside of the spline hole 20 provided to the hub 8b from the outside in the axial direction. As a result, in the case of the present embodiment, it can be prevented more effectively that the chips generated in the turning process enters into the space in which the encoder 28 is provided.

Also, according to the present embodiment, while the wheel bearing unit 5 manufactured by the parts maker prior to the coupling of the rotor 2 is carried to the assembling maker that manufactures a finished product of the wheel bearing unit 5, and so forth after the outer ring 6, the rotating member 23b, and a plurality of balls 17, 17 are assembled and also the cover 30c is fitted/fixed onto the inner end portion of the outer ring 6, adhesion of the foreign matter such as the magnetic power, or the like onto the inner side surface of the encoder 28 can be prevented until portions of both side surfaces of the rotor 2 near the outer diameter have been processed. In addition, if the cover 30c is removed from the inner end portion of the outer ring 6 immediately before the outer ring 6 is coupled/fixed to the knuckle 3, adhesion of the foreign matter onto the inner side surface of the encoder 28 can also be prevented after the fitting of the cover 30c just before the above removal while the wheel bearing unit 5 is carried from the parts maker to the assembling maker, and so forth. Further, since the cover 30c is removed from the inner end portion of the outer ring 6 after the portions of both side surfaces of the rotor 2 near the outer diameter are processed but before the outer ring 6 is coupled/fixed to the knuckle 3, such cover 30c never obstructs workings to combine the rotation speed sensor with the wheel bearing unit 5, to fit the wheel bearing unit 5 to the car, and so on.

Also, in the case of the present embodiment, the large-diameter circular cylinder portion 36 provided to the outer peripheral surface near the inner end of the outer ring 6 is clamped by the chuck 39 constituting the turning machine 38a. An improvement of the dimensional accuracy of the large-diameter circular cylinder portion 36 can be easily made. Therefore, the working of fitting the wheel bearing unit 5 to the side surface of the rotor 2 of which the turning process is applied to the turning machine 38a can be easily done. In addition, in the case of the present embodiment, the turning process is also applied to the outer peripheral surface of the rotor 2 by putting the precision machining tool 41c to such outer peripheral surface in applying the turning process to both side surfaces of the rotor 2, and thus the outer peripheral surface is finished into the predetermined shape and dimension. The particularly high dimensional accuracy is not required of the outer peripheral surface of the rotor 2, but it is preferable that the turning process should be applied to ensure a high rotational balance. Because the turning process is applied to the outer peripheral surface simultaneously with both side surfaces, a reduction in a production cost of the high-performance wheel bearing unit 5 can be attained.

Since other structures and operations are similar to those in the third embodiment shown in above FIGS. 8 and 9, their redundant explanation will be omitted herein by affixing the same reference numerals to like portions respectively.

Figure 15:
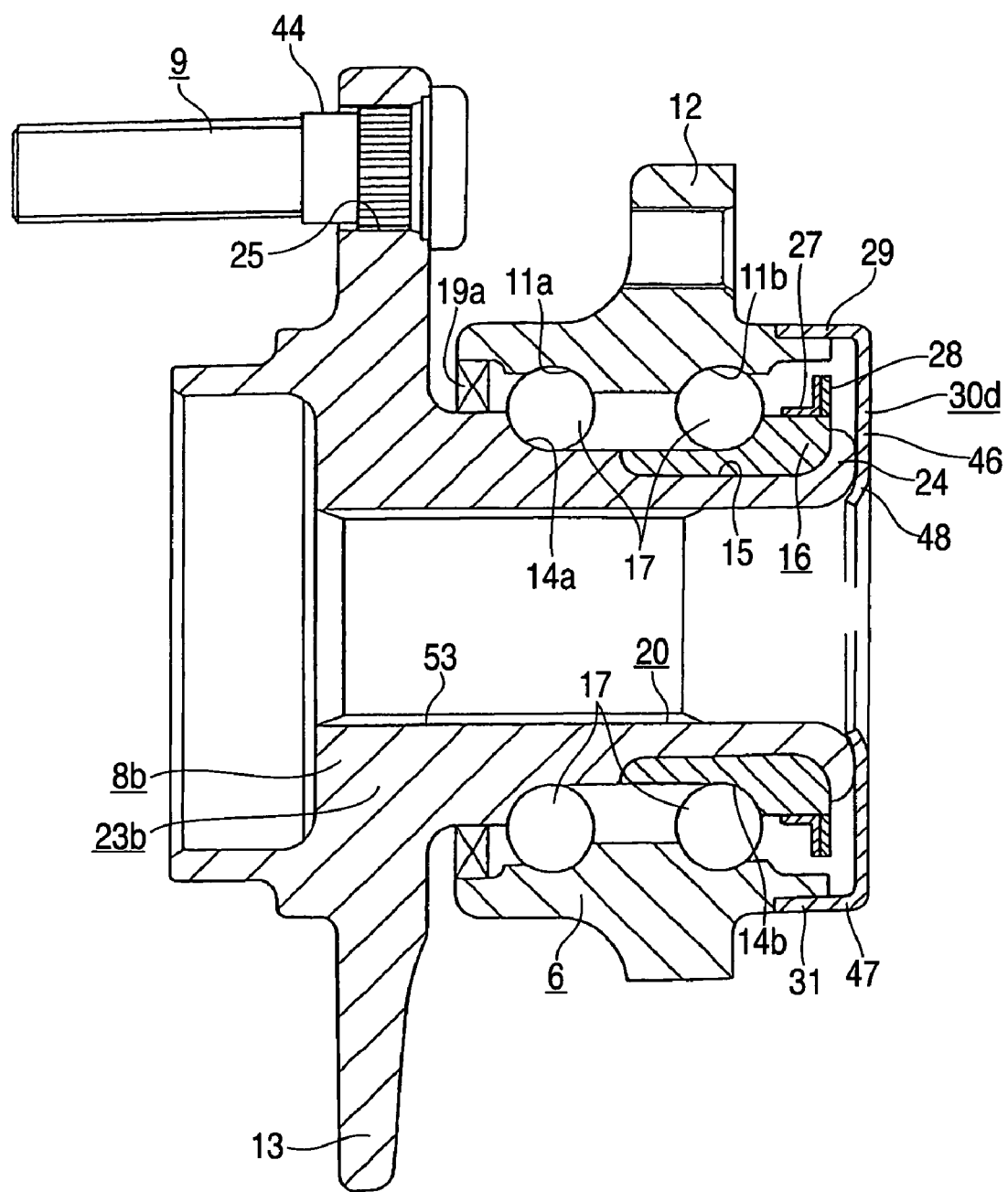
FIG. 15 is a sectional view showing an eighth embodiment of the present invention, which is similar to FIG. 13.
Figure 16:
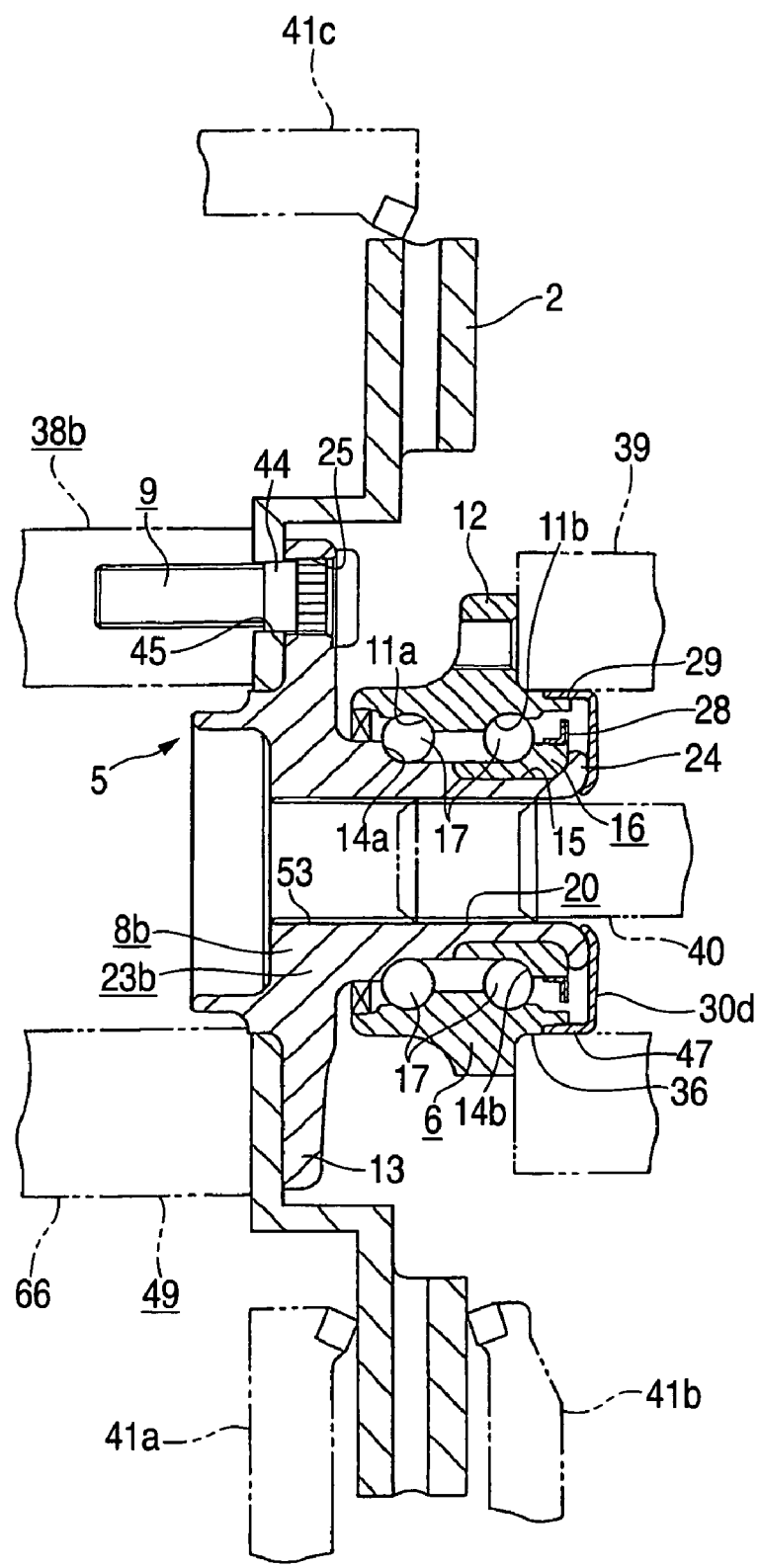
FIG. 16 is a sectional view showing the eighth embodiment, which is similar to FIG. 14.

Next, FIGS. 15 and 16 show an eighth embodiment of the present invention, which also corresponds to claims 2, 3, 5, and 6. In the case of a wheel bearing unit of the present embodiment, unlike the case of the seventh embodiment shown in above FIGS. 13 and 14, the reinforcing member 42 (see FIG. 13) to which the elastic member 43 is coupled is not fitted/fixed into the inner end portion of the outer ring 6. Therefore, no seal ring is present between the inner peripheral surface of the inner end portion of the outer ring 6 and the outer peripheral surface of the inner end portion of the inner ring 16.

Also, in the case of the present embodiment, out of a plurality of studs 9 that are fixed to the rotary flange 13 provided to the hub 8b, a fitting portion 44 provided in an intermediate portion of any one stud 9 is set larger in diameter than those of remaining suds. In conformity with this, out of a plurality of through holes 45 that are provided to fit the fitting portions 44 of these studs 9 into portions of the rotor 2 near the inner diameter (FIG. 16) without play, an inner diameter of any one through hole 45 is set larger than those of remaining through holes. As a consequence, only when the stud 9 having the large-diameter fitting portion 44 is inserted into the large-diameter through hole 45, the rotor 2 can be combined with the rotary flange 13 into a normal condition, i.e., a condition that the inner side surface of the rotor 2 near the inner diameter comes into contact with the outer side surface of the rotary flange 13. In the combined state in this manner, phases of the rotor 2 and the hub 8b having the rotary flange 13 in the circumferential direction are restricted uniquely.

Also, in the case of the present embodiment, in applying the turning process to both side surfaces of the rotor 2, a cover 30d is fitted/fixed onto the small-diameter stepped portion 29 provided to the outer peripheral surface of the inner end portion of the outer ring 6. This cover 30d is shaped into an annular ring that has the circular ring portion 46, and the cylinder portion 47 extended from the outer peripheral edge of this circular ring portion 46 in the axial direction. Also, since an inner peripheral edge portion of the circular ring portion 46 is curved over a full circumstance along a shape of the inner peripheral edge portion of the caulked portion 24 provided to the inner end portion of the hub 8b, such inner peripheral edge portion is shaped into a curved portion 48.

In applying the turning process to both side surfaces of the rotor 2, first respective constituent members of the wheel bearing unit 5 are assembled prior to the fitting of the rotor 2, as shown in FIG. 15, and also the cylinder portion 47 of the cover 30d is fitted/fixed onto the small-diameter stepped portion 29 provided to the outer peripheral surface of the inner end portion of the outer ring 6 by means of the clearance fit or the small interference fit. Also, an outer side surface of the curved portion 48 provided to the cover 30d is pushed against the inner side surface of the caulked portion 24. Then, as shown in FIG. 16, the fitting portions 44 provided to a plurality of studs 9 fixed to the rotary flange 13 are mated in phase with a plurality of through holes 45 provided to portions of the rotor 2 near the inner diameter, and then the inner side surface of the rotor 2 near the inner diameter is put on the outer side surface of the rotary flange 13 while fitting these fitting portions 44 into these through holes 45 respectively. Then, the wheel bearing unit 5 to both side surfaces of the rotor 2 of which the turning process is applied is fitted to the turning machine 38b in this condition. In this event, the large-diameter circular cylinder portion 36 provided to the outer peripheral surface near the inner end of the outer ring 6 is clamped by the chuck 39, and also a top end surface of an annular piston 66 of a hydraulic cylinder 49 provided to the turning machine 38b is pushed against a portion of the outer side surface of the rotor near the inner diameter. Concave portions are formed in portions opposing to respective studs 9 by a part of the annular piston 66 to prevent interference between these studs 9. With this arrangement, the wheel bearing unit 5 is held between the top end surface of the annular piston 66 and the top end surface of the chuck 39. Also, the top end portion of the rotating shaft 40a of the turning machine 38b is inserted into the inside of the spline hole 20 provided to the hub 8b from the inside in the axial direction, and then is spline-engaged with the female spline portion 53 of the spline hole 20. In this situation, both side surfaces and the outer peripheral surface of the rotor 2 are finished into the predetermined shape and dimension by putting the precision machining tools 41a to 41c to the concerned portions while rotating/driving the rotating shaft 40a.

In the case of the present embodiment, like the case of the seventh embodiment shown in above FIGS. 13 and 14, the swing of the braking friction surface provided to both side surfaces of the rotor 2 can be suppressed satisfactorily not to increase particularly a production cost, and also the chips generated during the turning process applied to the both side surface of the rotor 2 can be prevented from adhering to the inner side surface of the encoder 28. Also, in the case of the present embodiment, in applying the turning process to the both side surface of the rotor 2, the wheel bearing unit 5 is held between the top end surface of the annular piston 66 and the top end surface of the chuck 39. For this reason, unlike the case in the above seventh embodiment, there is no need to couple the rotor 2 and the rotary flange 13 by the tentatively setting screws during the turning process. In the case of the present embodiment, the top end portion of the rotating shaft 40a of the turning machine 38b is inserted into the inside of the spline hole 20 provided to the hub 8b from the inside in the axial direction. But this top end portion may be inserted into the inside of the spline hole 20 from the outside in the axial direction.

Also, in the case of the present embodiment, since the phases of the hub 8b and the rotor 2 in regarding to the circumferential direction can be restricted uniquely, their phases in regarding to the circumferential direction can be restored into the state prior to the disassembly without fail even though the hub 8b and the rotor 2 are disassembled in the repair shop, or the like and then reassembled. Therefore, the swing of both side surfaces of the rotor 2 can be suppressed small firmly after the reassembling.

Also, in the case of the present embodiment, because the reinforcing member 42 (see FIG. 13, etc.) to which the elastic member 43 is coupled is not fitted/fixed into the inner peripheral surface of the inner end portion of the outer ring 6, no seal ring is present between the inner peripheral surface of the inner end portion of the outer ring 6 and the outer peripheral surface of the inner end portion of the inner ring 16. In operation of such wheel bearing unit of the present embodiment, the wheel bearing unit 5 is fitted to the knuckle 3 and also the spline shaft 22 (see FIG. 21) constituting the constant velocity joint 21 is inserted into the spline hole 20. Then, in this condition, a sealing structure is provided between a part of the constant velocity joint 21 and the inner end portion of the knuckle 3. With such arrangement, although no seal ring is present between the inner peripheral surface of the inner end portion of the outer ring 6 and the outer peripheral surface of the inner end portion of the inner ring 16, the space in which the encoder 28 is provided can be sealed tightly from the outside. Also, in this case, the sensing portion of the rotation speed sensor opposing to the encoder 28 can be sealed tightly from the outside.

Since other structures and operations are similar to those in the seventh embodiment shown in above FIGS. 13 and 14, their redundant explanation will be omitted herein by affixing the same reference numerals to like portions respectively.

Figure 17:
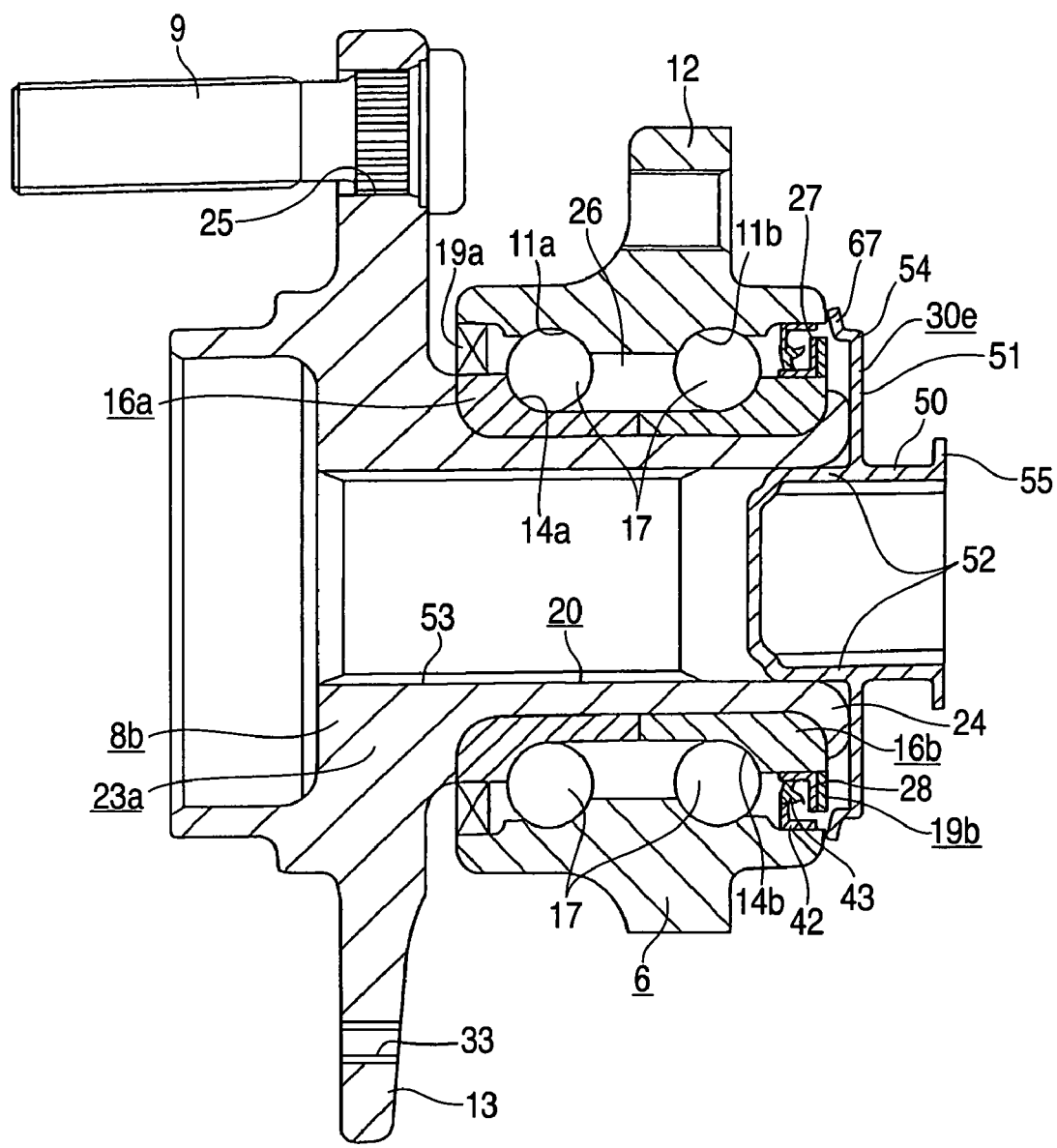
FIG. 17 is a sectional view showing a ninth embodiment of the present invention in a state that the cover is fixed to the inner end portion of the hub before the rotor is fixed to the rotary flange.
Figure 18:
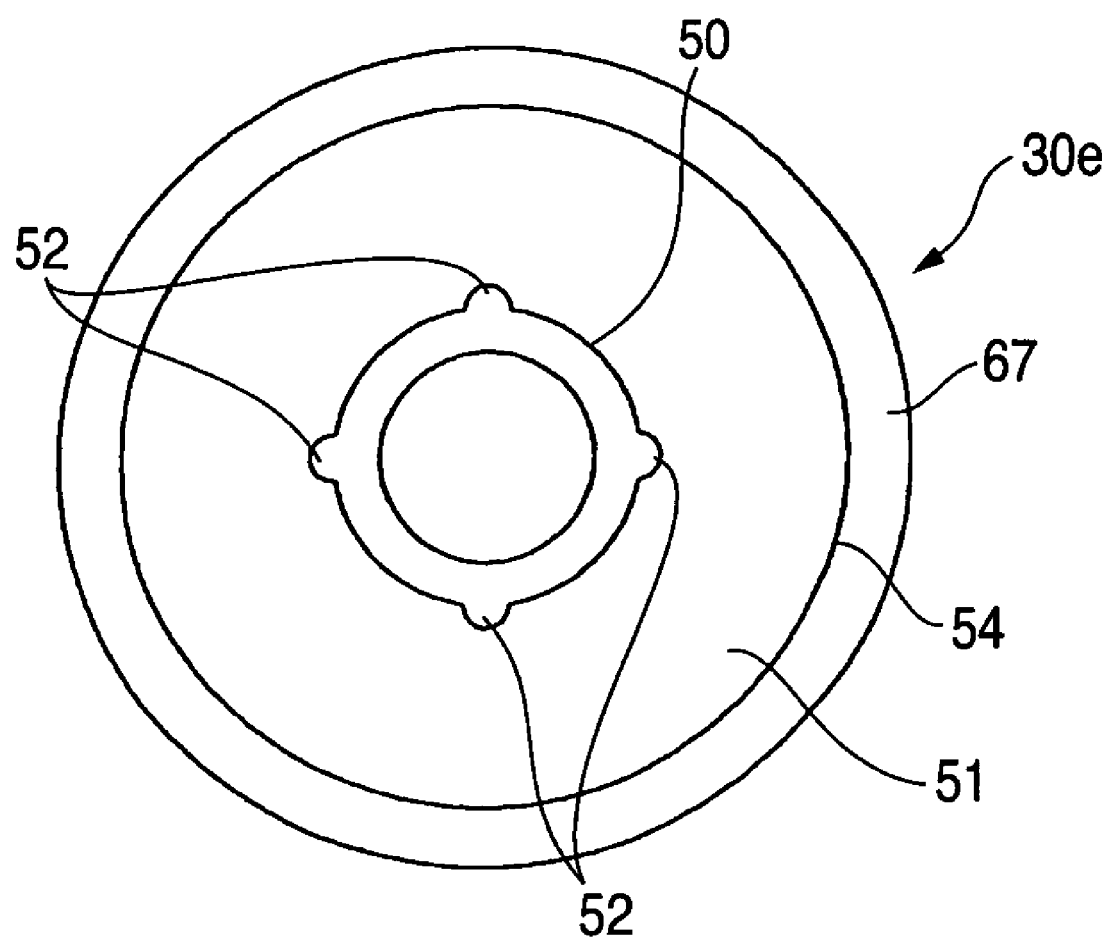
FIG. 18 is a view showing only the cover, when viewed from the left side in FIG. 17.

Next, FIGS. 17 and 18 show a ninth embodiment of the present invention, which also corresponds to claims 2, 3, 5, and 6. In the case of the present embodiment, a pair of inner rings 16a, 16b are fitted/fixed onto the outer peripheral surface of the middle portion of the hub 8b, and also the inner ring raceways 14a, 14b are formed on the outer peripheral surfaces of the inner rings 16a, 16b respectively. Also, a pair of seal rings 19a, 19b to seal tightly the internal space 26 in which a plurality of balls 17, 17 are provided are provided between the outer peripheral surfaces of the end portions of the inner rings 16a, 16b and the inner peripheral surfaces of both end portions of the outer ring 6. Also, in the case of the present embodiment, when the turning process is applied to both side surfaces of the rotor 2 (see FIG. 14, etc.) fixed to the rotary flange 13 provided to the hub 8b, a cover 30e is fitted/fixed into the inner end portion of the hub 8b. This cover 30e is formed by injecting a synthetic resin such as polyethylene terephthalate (PET), or the like by means of the injection molding, or the like. The cover 30e has the fitted cylinder portion 50 formed like the bottomed circular cylinder, and the pressing collar portion 51 provided to the middle portion of the outer peripheral surface of the fitted cylinder portion 50 and formed like the outward-directed flange. Also, plural locations (four locations in the illustrated case) of the fitted cylinder portion 50 in the circumferential direction are expanded toward the outer diameter side over an almost full length along the axial direction, and thus the projected portions 52, 52 are provided to plural locations in the circumferential direction. Also, a diameter of a circumscribed circle of these projected portions 52, 52 in their free state is set slightly larger than an inner diameter of the inner diameter portion of the spline hole 20 provided to the hub 8b, which gets out of the area in which the female spline portion 53 is formed. Also, a cylinder portion 54 is provided on the outer peripheral edge portion of the pressing collar portion 51 to extend in the axial direction, and also a taper portion 67 whose diameter is increased gradually toward the top end edge is provided to the top end portion of the cylinder portion 54. Also, a latching collar portion 55 formed like the outward-directed flange is provided to the outer peripheral surface of the base end portion (the right end portion in FIG. 17) of the fitted cylinder portion 50.

In applying the turning process to both side surfaces of the rotor 2, first respective constituent members of the wheel bearing unit which is in a state that the rotor 2 is not coupled yet are assembled, and also the fitted cylinder portion 50 of the cover 30e is fitted/fixed into the inner end portion of the spline hole 20 provided to the hub 8b via a plurality of projected portions 52, 52 by means of the small interference fit. Also, a portion of the outer side surface of the pressing collar portion 51 near the inner diameter is pushed against the end portion of the caulked portion 24 provided to the inner end portion of the hub 8b, and also the top end edge of the taper portion 67 provided to the portion of the pressing collar portion 51 near the outer diameter is pushed against the inner end surface of the outer ring 6. Then, the wheel bearing unit is fitted to the turning machine 38a (see FIG. 14, etc.) in a state that the portion of the rotor 2 near the inner diameter is fixed to the rotary flange 13 provided to the outer peripheral surface of the hub 8b by the tentatively setting screws 35 (see FIG. 14). Also, the top end portion of the rotating shaft 40a (see FIG. 14, etc.) of the turning machine 38a is inserted into the inside of the spline hole 20 from the outside in the axial direction, and then is spline-engaged with the female spline portion 53 of the spline hole 20. In this situation, the turning process is applied to both side surfaces of the rotor 2 while rotating/driving the rotating shaft 40a. Also, because the outer ring 6 is turned around the hub 8b in the turning process, the top end edge of the taper portion 67 provided to the cover 30e fixed to this hub 8b is slid on the inner end surface of the outer ring 6 and thus a frictional resistance is generated at the sliding portion. In the case of the present embodiment, in order to suppress such frictional resistance, a thickness of the top end portion of the taper portion 67 is set smaller than 0.3 mm or less.

As described above, in the case of the present embodiment, the space between the inner peripheral surface of the inner end portion of the outer ring 6 and the outer peripheral surface of the inner end portion of the hub 8b is sealed tightly by the cover 30e during the turning process. Therefore, it can be prevented that the chips generated in the turning process adhere to the inner side surface of the encoder 28. Also, an operation of removing the cover 30e from the hub 8b before the wheel bearing unit is fitted to the suspension system can be easily carried out by the operator who pinches the portion projected from the inner end surface of the hub 8*b* in the base half portion (the right half portion in FIG. 17) of the fitted cylinder portion 50 constituting the cover 30*e*.

Also, in the case of the present embodiment, because the latching collar portion 55 is provided to the outer peripheral surface of the base end portion of the fitted cylinder portion 50, automation of the operation of removing the cover 30*e* from the hub 8*b* can be readily realized. For example, when the arm of the assembling robot (not shown) is moved toward the inner end side of the hub 8*b* while grasping the latching collar portion 55 with fingers of the assembling robot, the cover 30*e* can be removed easily from the hub 8*b*. If the assembling robot to perform such operation is employed, the automation of the operation of removing the cover 30*e* from the hub 8*b* can be achieved.

Also, in the case of the present embodiment, the fitted cylinder portion 50 of the cover 30*e* is fitted/fixed into the inner end portion of the spline hole 20 via a plurality of projected portions 52, 52 during the turning process applied to both side surfaces of the rotor 2. Therefore, a dimensional tolerance of the inner diameter of the inner end portion of the spline hole 20 can be set large like 0.2 mm. Thus, even when the processed inner diameter of the inner end portion of the spline hole 20 is formed smaller than a normal dimension, the fitted cylinder portion 50 can be detachably attached easily to the spline hole 20 by a small force.

Since other structures and operations are similar to those in the seventh embodiment shown in above FIGS. 13 and 14, their redundant explanation will be omitted herein by affixing the same reference numerals to like portions respectively.

Figure 19:
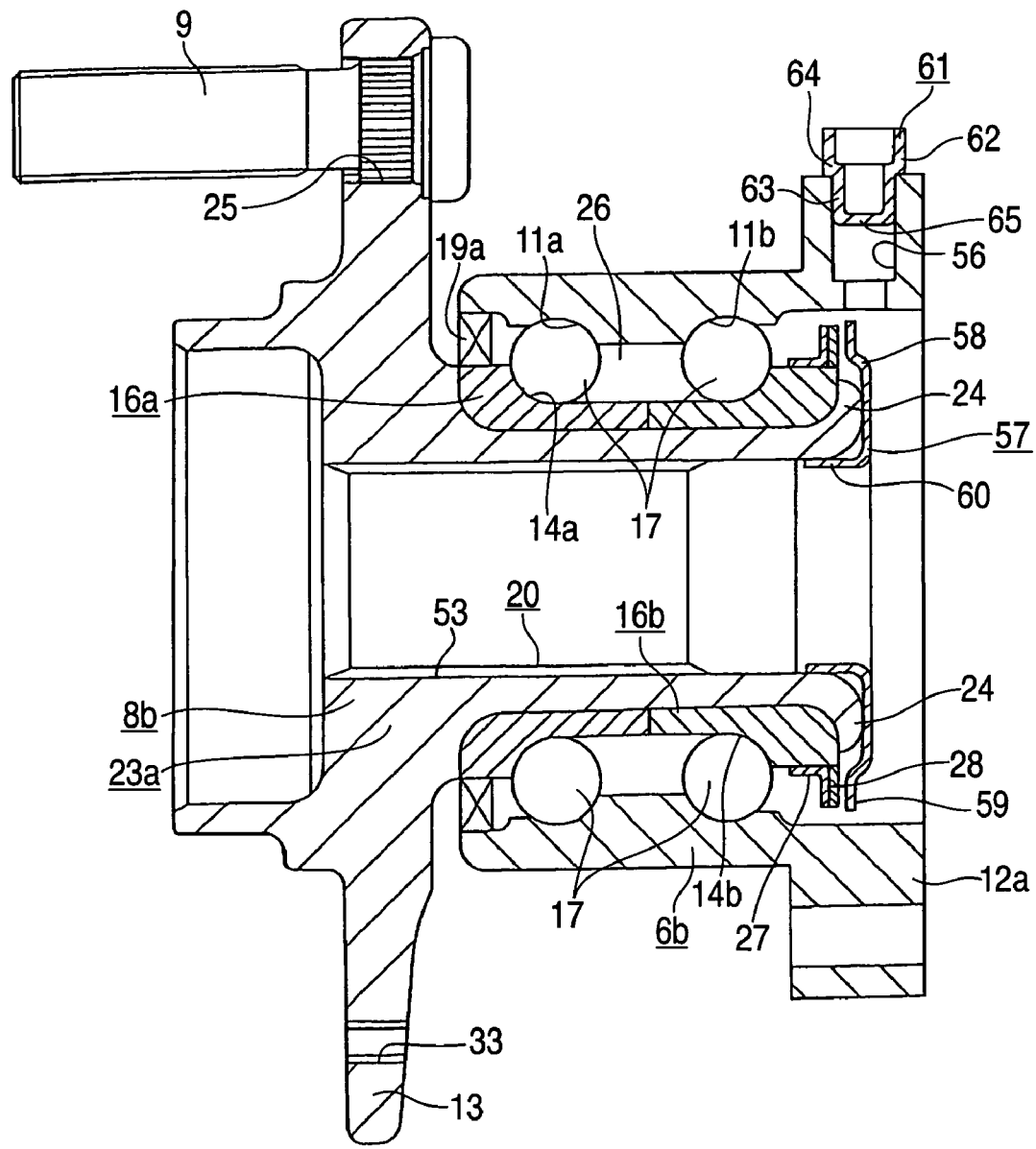
FIG. 19 is a sectional view showing a tenth embodiment of the present invention in a state that the cover and the stop plug are fitted to the inner end portion of the hub and the insertion hole provided to the outer ring respectively before the rotor is fixed to the rotary flange.

Next, FIG. 19 shows a tenth embodiment of the present invention, which also corresponds to claims 2, 3, 5, and 6. In the case of the present embodiment, an insertion hole 56 that passes through from the outer peripheral surface to the inner peripheral surface is formed in a part at a circumferential section of a stationary flange 12*a* provided to the outer peripheral surface of the inner end portion of an outer ring 6*b*. In operation of the wheel bearing unit, a circular cylinder portion constituting the rotation speed sensor (not shown) is inserted into the inside of the insertion hole 56. Also, in the case of the present embodiment, when the turning process is applied to both side surfaces of the rotor 2 (see FIG. 14, etc.), the outer peripheral surface of the caulked portion 24 provided to the inner end portion of the hub 8*b* is isolated from the inner peripheral surface of the inner end portion of the outer ring 6*b* by a cover 57 and also the insertion hole 56 is closed by a stop plug 61. The cover 57 is formed like an annular ring as a whole to have an almost ⊐-shaped cross section. Also, a collar portion 59 formed like the outward-directed flange is provided to a top end edge portion of an outer-diameter-side cylinder portion 58 constituting the cover 57. Such cover 57 is fitted to the hub 8*b* by fitting an inner-diameter-side cylinder portion 60 provided to the inner peripheral edge portion into the inner end portion of the hub 8*b* before the turning process is applied to both side surfaces of the rotor 2. In this state, the outer peripheral edge of the collar portion 59 provided to the cover 57 is opposed closely to the inner peripheral surface of the inner end portion of the outer ring 6*b* via a small clearance and the outer side surface of the collar portion 59 is opposed closely to the inner side surface of the encoder via a small clearance. Then, the space in which the encoder 28 is provided is isolated from the outside.

Also, the stop plug 61 is formed by coupling concentrically a large-diameter-side cylinder portion 62 provide to its base half portion to a small-diameter-side cylinder portion 63 provided to its top half portion via a stepped portion 64. Also, an opening of a top end portion (lower end portion in FIG. 19) of the small-diameter-side cylinder portion 63 is closed by a bottom plate portion 65. When the small-diameter-side cylinder portion 63 is fitted into the insertion hole 56 and also one side surface of the stepped portion 64 is brought into contact with the peripheral portion of the opening end of the insertion hole 56 on the outer diameter on the outer peripheral surface of the stationary flange 12*a*, such stop plug 61 closes the insertion hole 56 before the turning process is applied to both side surfaces of the rotor 2.

In the case of the present embodiment constructed as above, because the insertion hole 56 provided to a part of the outer ring 6*b* is stopped by the stop plug 61 during the turning process applied to both side surfaces of the rotor 2, it can be prevented that the chips generated in the turning process enter into the space, in which the encoder 28 is provided, through the insertion hole 56. As a result, not only the space between the inner peripheral surface of the inner end portion of the outer ring 6*b* and the outer peripheral surface of the inner end portion of the hub 8*b* can be closed by the cover 57 but also the adhesion of the chips onto the inner side surface of the encoder 28 can be prevented, so that an improvement of a sensing performance of the rotation speed sensor that is opposed to the encoder 28 can be achieved.

Since other structures and operations are similar to those in the ninth embodiment shown in above FIGS. 17 and 18, their redundant explanation will be omitted herein by affixing the same reference numerals to like portions respectively.

Figure 20:
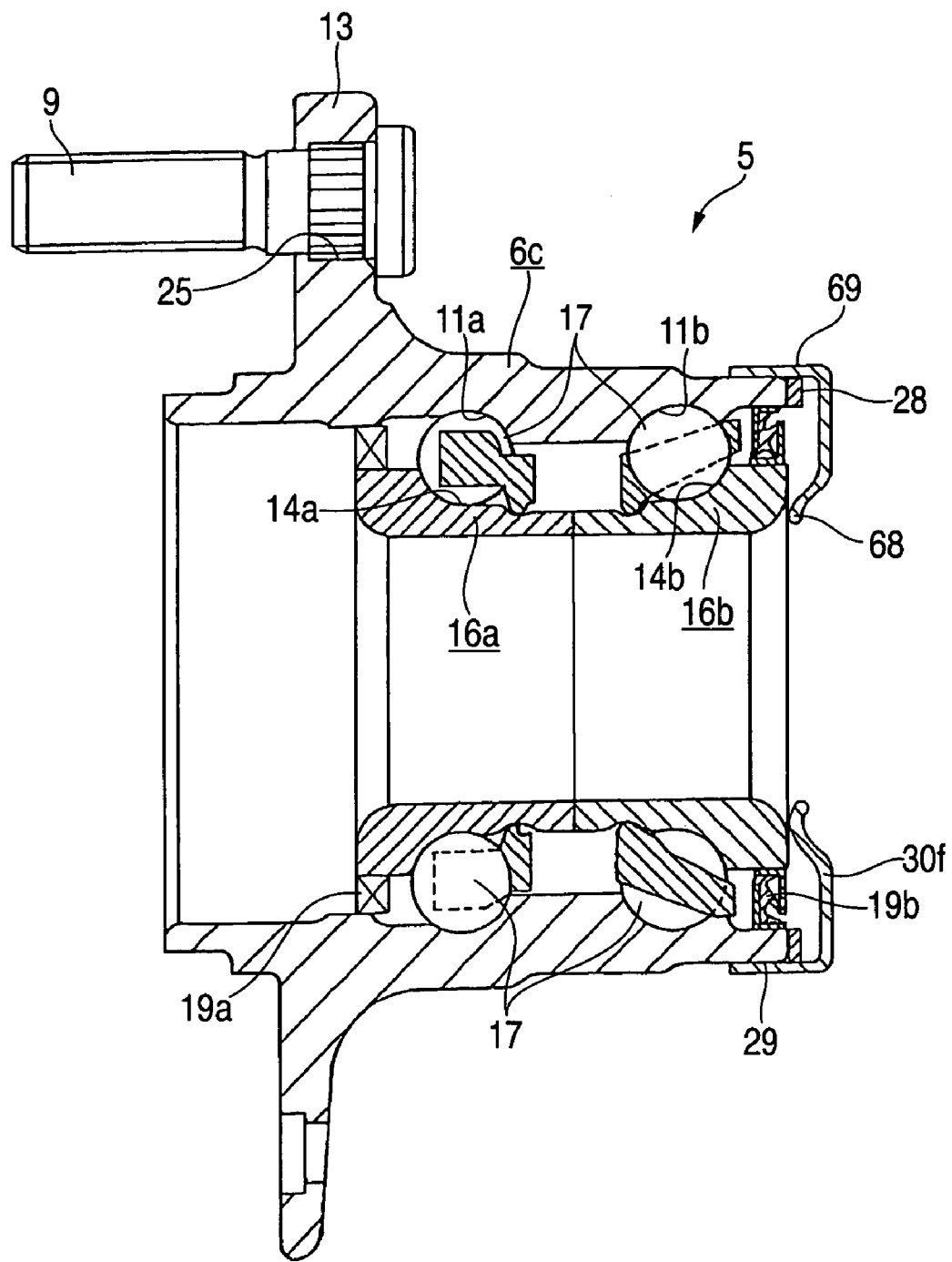
FIG. 20 is a sectional view showing an eleventh embodiment of the present invention in a state that the cover is fixed to the inner end portion of the outer ring before the rotor is fixed to the rotary flange.

Next, FIG. 20 shows an eleventh embodiment of the present invention, which corresponds to claims 2 and 5. In the case of above embodiments, the wheel bearing unit has a structure in which its inner ring is rotated. In contrast, in the case of the present embodiment, the wheel bearing unit 5 has a structure in which its outer ring is rotated. In other words, in the case of the present embodiment, an outer ring 6*c* is used as the rotary ring that is rotated in operation and a pair of inner rings 16*a*, 16*b* arranged on the inner side of the outer ring 6*c* are used as the stationary ring that is not rotated in operation. Also, the encoder 28 is coupled/fixed to the inner end surface of the outer ring 6*c*.

In such configuration of the present embodiment, the operation of applying the turning process to both end surfaces of the rotor 2 (see FIG.14, etc.) is performed as follows. That is, first respective constituent members of the wheel bearing unit before the rotor 2 is coupled are assembled and also the portion of the rotor 2 near the inner diameter is coupled/fixed to the outer side surface of the rotary flange 13 provided to the outer peripheral surface of the outer end portion of the outer ring 6*c*. Also, a cover 30*f* is fitted/fixed onto the inner end portion of the outer ring 6*c*. The cover 30*f* is formed like an annular ring as a whole to have an almost ⊐-shaped cross section, and a lip portion 68 is provided to its inner peripheral edge portion. Then, an outer-diameter-side cylinder portion 69 constituting the cover 30*f* is fitted/fixed onto the small- diameter stepped portion 29 provided to the inner end portion of the outer ring 6*c*. Also, a top end edge of the lip portion 68 provided to the cover 30*f* is pushed against the inner end surface of the inside inner ring 16*b* out of a pair of inner rings 16*a*, 16*b*. In this state, the space in which the encoder 28 is provided is isolated from the outside of the cover 30f. Then, in this condition, the wheel bearing unit with the side surface of the rotor 2, to which the turning process is applied, is fitted to the turning machine (not shown). Also, the rotating shaft coupled to the end portion of the chuck is turned in a state that a pair of inner rings 16a, 16b are fitted/fixed onto the fixed supporting shaft constituting the turning machine and also the portion of the outer peripheral surface of the outer ring 6c near the inner end, which is deviated from the portion onto which the cover 30f is fitted, is clamped by the chuck of the turning machine. Then, in this condition, the turning process is applied to both side surfaces of the rotor 2 near the outer diameter by putting the precision machining tool to these surfaces, and thus both side surfaces are finished into the predetermined shape and dimension. In the case of the wheel bearing unit manufactured in this manner, a sensing performance of the rotation speed sensor (not shown) that is faced to the encoder 28 can be assured sufficiently, and also the swing of the braking friction surface provided to both side surfaces of the rotor 2 can be suppressed satisfactorily.

In the case of above embodiments, the case where the rolling bearing constituting the wheel bearing unit is the ball bearing in which the balls are used as a plurality of rolling elements is explained. However, the present invention is not limited to such configuration, and may be applied to the case where the rolling bearing constituting the wheel bearing unit consists of other rolling bearings such as the roller bearing in which the cylindrical rollers, the tapered rollers, or the like are used as a plurality of rolling elements. Also, in the above embodiments, the case where the side surface of the rotary flange 13 or both side surfaces of the rotor 2 are processes into the predetermined shape and dimension by the turning process is explained. However, the wheel bearing unit of the present invention contains such a configuration that the side surface of the rotary flange or the braking friction surface of the braking rotating body is processed into predetermined shape and dimension by applying other processing such as the grinding process, the superfinishing process, or the like while turning the rotary ring around the stationary ring.

The present invention is explained in detail with reference to particular embodiments. But it is apparent for the skilled person that various variations and modifications may be applied without departing from a spirit and a scope of the present invention.

This application is filed based on Japanese Patent Application (Patent Application No. 2002-304934) filed on Oct. 18, 2002, and contents thereof are incorporated herein by the reference.

INDUSTRIAL APPLICABILITY

The wheel bearing unit and the method of manufacturing the same of the present invention are constructed and operated as described above. Therefore, the rotation speed of the wheel can be sensed with good performance and also unpleasant noise and vibration generated in the braking operation can be suppressed.

The invention claimed is:

1. A method of processing a wheel bearing unit that includes a stationary ring that has a stationary raceway on a stationary peripheral surface and is not rotated in operation, a rotary ring that has a rotary raceway on a rotary peripheral surface and is rotated in operation, a plurality of rolling elements provided between the stationary raceway and the rotary raceway, an encoder fixed to a part of the rotary ring and at least a part of the encoder is made of a permanent magnet, a cover fixed on an opening portion of an axially inner end of the stationary ring and having an insertion hole for inserting a part of a holder of a sensor in operation, and a rotary flange provided to an outer peripheral surface of the rotary ring, wherein said rotary flange couples/supports a braking rotating body on a side surface of the rotary flange at least in operation, the braking rotating body having a braking friction surface against which a friction material is pushed in a braking operation, comprising:

processing a portion of the wheel bearing unit or the braking rotating body into predetermined shape and dimension in a state that the stationary ring, the rotary ring, and the plurality of rolling elements are assembled together, wherein prior to the processing a space in which the encoder is provided is isolated from an outside by fitting a stop plug to the insertion hole of the cover, and removing the stop plug from the cover after the portion of the wheel bearing unit is processed into predetermined shape and dimension but before the wheel bearing unit is fitted to a suspension system.

2. A method of manufacturing a wheel bearing unit set forth in claim 1, wherein the processing comprises processing the side surface of the rotary flange into predetermined shape and dimension while rotating the rotary ring around the stationary ring in the state that the stationary ring, the rotary ring, and the plurality of rolling elements are assembled together.

3. A method of manufacturing a wheel bearing unit set forth in claim 1, wherein the processing comprises processing the braking friction surface into predetermined shape and dimension while rotating the rotary ring that couples/supports the braking rotating body around the stationary ring in a state that the stationary ring, the rotary ring, and the plurality of rolling elements are assembled together.

4. A method of manufacturing a wheel bearing unit set forth in claim 1, wherein the stationary ring is an outer ring that has an outer ring raceway as the stationary raceway on an inner peripheral surface as the stationary peripheral surface, and the rotary ring is a rotating member that is arranged on an inner diameter side of the outer ring and has an inner ring raceway as the rotary raceway on an outer peripheral surface as the rotary peripheral surface, and wherein the processing comprises processing the side surface of the rotary flange provided to an outer peripheral surface of the rotating member into predetermined shape and dimension while rotating the rotating member around the outer ring in the state that the outer ring, the rotating member, and the plurality of rolling elements are assembled together.

5. A method of manufacturing a wheel bearing unit set forth in claim 1, wherein the stationary ring is an outer ring that has an outer ring raceway as the stationary raceway on an inner peripheral surface as the stationary peripheral surface, and the rotary ring is a rotating member that is arranged on an inner diameter side of the outer ring and has an inner ring raceway as the rotary raceway on an outer peripheral surface as the rotary peripheral surface, and wherein the processing comprises processing the braking friction surface of the braking rotating body into predetermined shape and dimension while rotating the rotating member around the outer ring in the state that the outer ring, the rotating member, and the plurality of rolling elements are assembled together.

* * * * *